US012808437B2

(12) United States Patent
Ellisor et al.

(10) Patent No.: US 12,808,437 B2
(45) Date of Patent: *Nov. 24, 2026

(54) DUAL RING STUFFING BOX

(71) Applicant: Vulcan Industrial Holdings, LLC, Houston, TX (US)

(72) Inventors: Kyle Matthew Ellisor, Katy, TX (US); Chance Ray Mullins, Spring, TX (US); Steven Zachary Newberg, Houston, TX (US); Akhil Alex, Houston, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/265,203

(22) Filed: Jul. 10, 2025

(65) Prior Publication Data

US 2026/0126115 A1 May 7, 2026

Related U.S. Application Data

(63) Continuation of application No. 18/775,355, filed on Jul. 17, 2024, now Pat. No. 12,404,931, which is a (Continued)

(51) Int. Cl.
*F16J 15/18* (2006.01)
*E21B 43/26* (2006.01)

(52) U.S. Cl.
CPC ........... *F16J 15/18* (2013.01); *E21B 43/2607* (2020.05)

(58) Field of Classification Search
CPC F16J 15/18; F16J 15/181; F16J 15/182; F16J 15/183; F16J 15/184
See application file for complete search history.

(56) References Cited

U.S. PATENT DOCUMENTS 1,316,539 A 9/1919 Ford
1,364,848 A 1/1921 Walsh
(Continued)

FOREIGN PATENT DOCUMENTS

CN 2550492 Y 5/2003
CN 2556355 Y 6/2003
(Continued)

OTHER PUBLICATIONS

Declaration of Duncan Hall from Internet Archive/Wayback Machine, Feb. 3, 2021, Kerr Plunger Pump Manuals, 20 pages.
(Continued)

*Primary Examiner* — Gilbert Y Lee
(74) *Attorney, Agent, or Firm* — Womble Bond Dickinson (US) LLP

(57) ABSTRACT

A system includes a fluid end having a fluid end face and a recess extending toward a base. The system also includes a pressure ring extending from the fluid end face, the pressure ring having a pressure ring bore diameter larger than a fluid end bore diameter. The system further includes an adjacent ring coupled to the fluid end, the pressure ring positioned between the adjacent ring and the base, wherein at least one fastener extends through an aperture of the adjacent ring to couple the adjacent ring to the fluid end. The system includes packing material positioned within at least a portion of the pressure ring bore, the packing material positioned such that axial movement toward the fluid end is blocked by the base.

20 Claims, 14 Drawing Sheets

Related U.S. Application Data continuation of application No. 17/864,873, filed on Jul. 14, 2022, now Pat. No. 12,055,221, which is a continuation-in-part of application No. 17/213,854, filed on Mar. 26, 2021, now Pat. No. 11,391,374, which is a continuation-in-part of application No. 29/769,314, filed on Feb. 4, 2021, now Pat. No. Des. 933,104, and a continuation-in-part of application No. 29/769,318, filed on Feb. 4, 2021, now Pat. No. Des. 933,105.

(60) Provisional application No. 63/137,501, filed on Jan. 14, 2021.

(56) References Cited

U.S. PATENT DOCUMENTS 1,576,269 A 3/1926 Durant
1,595,459 A 8/1926 Durant
1,671,139 A 5/1928 Wilson
1,836,068 A 12/1931 Goldsberry
1,873,318 A 8/1932 Eason
1,914,737 A 6/1933 Elms
1,947,198 A * 2/1934 Goble .................... F16J 15/187 184/105.3
1,948,628 A 2/1934 Penick
1,963,684 A 6/1934 Shimer
1,963,685 A 6/1934 Shimer
2,004,259 A 6/1935 Weiger
2,011,547 A 8/1935 Campbell
2,069,443 A 2/1937 Hill
2,103,504 A 12/1937 White
2,143,399 A 1/1939 Abercrombie
2,146,709 A 2/1939 Bird
2,151,442 A 3/1939 Hardy
2,163,472 A 6/1939 Shimer
2,252,488 A 8/1941 Bierend
2,304,991 A 12/1942 Foster
2,506,128 A 5/1950 Ashton
2,539,996 A 1/1951 Gleitz
2,547,831 A 4/1951 Mueller
2,713,522 A 7/1955 Lorenz
2,719,737 A 10/1955 Fletcher
2,745,631 A 5/1956 Shellman
2,756,960 A 7/1956 Church
2,898,082 A 8/1959 Almen
2,969,951 A 1/1961 Walton
2,977,874 A 4/1961 Ritzerfeld et al.
2,982,515 A 5/1961 Clinton
2,983,281 A 5/1961 Bynum
3,048,412 A * 8/1962 Baker .................... F16J 15/186 277/516
3,049,082 A 8/1962 Barry
3,053,500 A 9/1962 Atkinson
3,063,467 A 11/1962 Roberts, Jr.
3,120,960 A 2/1964 Pippert et al.
3,166,332 A 1/1965 Olson
3,191,617 A 6/1965 Maddox
3,224,817 A 12/1965 Carter
3,276,390 A 10/1966 Bloudoff
3,277,837 A 10/1966 Pangburn
3,288,475 A 11/1966 Benoit
3,459,363 A 8/1969 Miller
3,474,808 A 10/1969 Elliott
3,483,885 A 12/1969 Leathers
3,489,098 A 1/1970 Roth
3,489,170 A 1/1970 Leman
3,512,787 A 5/1970 Kennedy
3,590,387 A 6/1971 Landis
3,638,956 A * 2/1972 Dagwell ................ F16J 15/184 277/504
3,640,501 A 2/1972 Walton
3,652,098 A 3/1972 Kawazu et al.
3,698,726 A 10/1972 Schettler
3,738,665 A 6/1973 Bilco
3,785,659 A 1/1974 Maurer et al.
3,809,508 A 5/1974 Uchiyama
3,837,356 A 9/1974 Selep et al.
3,847,511 A 11/1974 Cole
3,907,307 A 9/1975 Maurer
3,920,252 A 11/1975 Dechavanne
3,931,755 A 1/1976 Hatridge
4,035,107 A 7/1977 Kesten et al.
4,044,834 A 8/1977 Perkins
4,076,212 A 2/1978 Leman
4,160,627 A 7/1979 Cole
4,161,187 A 7/1979 Bauer
4,184,814 A 1/1980 Parker
4,191,386 A * 3/1980 Hershey ................. F16J 15/162 277/358
4,219,204 A 8/1980 Pippert
4,277,229 A 7/1981 Pacht
4,306,728 A 12/1981 Huperz
4,331,741 A 5/1982 Wilson
4,395,050 A 7/1983 Wirz
4,398,731 A 8/1983 Gorman
4,399,871 A 8/1983 Adkins et al.
4,406,336 A 9/1983 Olsen
4,440,404 A 4/1984 Roach
4,500,267 A 2/1985 Birdwell
4,508,133 A 4/1985 Hamid
4,518,359 A 5/1985 Yao-Psong
4,527,806 A 7/1985 Ungchusri
4,565,297 A 1/1986 Korner
4,580,791 A 4/1986 DiRusso
4,586,569 A 5/1986 Hyde
4,662,392 A 5/1987 Vadasz
4,716,924 A 1/1988 Pacht
4,754,950 A 7/1988 Tada
4,763,876 A 8/1988 Oda
4,768,933 A 9/1988 Stachowiak
4,770,206 A 9/1988 Sjoberg
4,807,890 A 2/1989 Gorman
4,811,758 A 3/1989 Piper
4,822,058 A 4/1989 Butler et al.
4,856,758 A 8/1989 Knapp
4,861,241 A 8/1989 Gamboa
4,872,395 A 10/1989 Bennitt et al.
4,878,815 A 11/1989 Stachowiak
4,911,410 A 3/1990 Baker
4,919,719 A 4/1990 Abe
4,928,921 A 5/1990 Steele
4,951,707 A 8/1990 Johnson
5,020,490 A 6/1991 Seko
5,052,435 A 10/1991 Crudup
5,061,159 A 10/1991 Pryor
5,062,450 A 11/1991 Bailey
5,073,096 A 12/1991 King et al.
5,080,713 A 1/1992 Ishibashi
5,088,521 A 2/1992 Johnson
5,127,807 A 7/1992 Eslinger
5,131,666 A 7/1992 Hutchens
5,135,238 A 8/1992 Wells
5,149,107 A 9/1992 Maringer
5,201,491 A 4/1993 Domangue
5,209,495 A 5/1993 Palmour
5,209,497 A * 5/1993 Von Bergen ............. F16J 15/46 277/358
5,249,600 A 10/1993 Blume
5,267,736 A 12/1993 Pietsch
5,273,570 A 12/1993 Sato
5,284,320 A 2/1994 Michael et al.
5,297,805 A 3/1994 Merkin
5,299,812 A 4/1994 Brestel
5,314,659 A 5/1994 Hidaka
5,316,086 A 5/1994 DeMoss
5,362,215 A 11/1994 King
5,370,362 A 12/1994 Kent et al.
5,382,057 A 1/1995 Richter
5,398,715 A 3/1995 Pacht
5,478,048 A 12/1995 Salesky
5,493,951 A 2/1996 Harrison
5,526,878 A 6/1996 Duell et al.
5,533,245 A 7/1996 Stanton

(56) References Cited

U.S. PATENT DOCUMENTS 5,540,570 A 7/1996 Schuller
5,549,160 A 8/1996 Bownes et al.
5,572,920 A 11/1996 Kennedy
5,593,166 A 1/1997 Lovell et al.
5,622,371 A 4/1997 Angelo
5,626,345 A 5/1997 Wallace
5,636,688 A 6/1997 Bassinger
5,674,449 A 10/1997 Liang
5,806,858 A 9/1998 Harrelson, III
5,823,510 A 10/1998 Muramatsu et al.
5,834,664 A 11/1998 Aonuma
5,859,376 A 1/1999 Ishibashi
5,895,517 A 4/1999 Kawamura
5,924,853 A 7/1999 Pacht
5,949,003 A 9/1999 Aoki
5,957,208 A 9/1999 Schnatzmeyer
6,004,372 A 12/1999 Quets
6,070,608 A 6/2000 Pringle
6,125,810 A 10/2000 Haselkorn
6,139,599 A 10/2000 Takahashi
6,200,688 B1 3/2001 Liang
6,209,445 B1 4/2001 Roberts, Jr.
6,251,157 B1 6/2001 Aoki et al.
6,328,112 B1 12/2001 Malone
6,328,312 B1 12/2001 Schmitz
6,340,377 B1 1/2002 Kawata
6,382,940 B1 5/2002 Blume
6,386,548 B1 5/2002 Grimanis et al.
6,422,317 B1 7/2002 Williamson, Jr.
6,431,521 B1 8/2002 Jones
6,436,338 B1 8/2002 Qiao
6,446,939 B1 9/2002 Hoppe
6,454,015 B1 9/2002 Armstrong et al.
6,460,620 B1 10/2002 LaFleur
6,464,749 B1 10/2002 Kawase
6,482,275 B1 11/2002 Qiao
6,485,678 B1 11/2002 Liang
6,544,012 B1 4/2003 Blume
6,571,684 B1 6/2003 Nov et al.
6,623,259 B1 9/2003 Blume
6,634,236 B2 10/2003 Mars
6,641,112 B2 11/2003 Antoff
6,695,007 B2 2/2004 Vicars
6,702,905 B1 3/2004 Qiao
6,712,871 B2 3/2004 Oh
6,715,558 B2 4/2004 Williamson
6,715,693 B1 4/2004 Dam et al.
6,796,321 B2 9/2004 Vicars
6,880,802 B2 4/2005 Hara
6,910,871 B1 6/2005 Blume
6,916,444 B1 7/2005 Liang
6,951,165 B2 10/2005 Kuhn
6,951,579 B2 10/2005 Koyama
6,955,181 B1 10/2005 Blume
6,959,732 B2 11/2005 Cotton, III et al.
6,959,916 B2 11/2005 Chigasaki
7,000,632 B2 2/2006 McIntire
7,028,928 B2 4/2006 Shinogle
7,036,824 B2 5/2006 Kunz
7,144,440 B2 12/2006 Ando
7,168,440 B1 1/2007 Blume
7,186,097 B1 3/2007 Blume
7,222,837 B1 5/2007 Blume
7,290,560 B2 11/2007 Orr
7,296,591 B2 11/2007 Moe
7,335,002 B2 2/2008 Vicars
7,341,435 B2 3/2008 Vicars
7,398,955 B2 7/2008 Weingarten
7,506,574 B2 3/2009 Jensen
7,513,483 B1 4/2009 Blume
7,513,759 B1 4/2009 Blume
7,520,329 B2 4/2009 Reid et al.
7,562,675 B2 7/2009 Nomichi et al.
7,572,312 B2 8/2009 Kawata et al.
7,611,590 B2 11/2009 Liang
7,681,589 B2 3/2010 Schwegman
7,682,471 B2 3/2010 Levin
7,726,026 B1 6/2010 Blume
7,748,310 B2 7/2010 Kennedy
7,754,142 B2 7/2010 Liang
7,754,143 B2 7/2010 Qiao
7,757,396 B2 7/2010 Sawada
7,789,133 B2 9/2010 McGuire
7,789,161 B2 9/2010 Riley
7,793,913 B2 9/2010 Hara
7,828,053 B2 11/2010 McGuire
7,845,413 B2 12/2010 Shampine
7,861,738 B2 1/2011 Erbes
7,866,346 B1 1/2011 Walters
7,891,374 B2 2/2011 Vicars
7,931,078 B2 4/2011 Toporowski et al.
7,954,510 B2 6/2011 Schwegman
7,992,635 B2 8/2011 Cherewyk
8,020,638 B2 9/2011 Chellappa et al.
8,069,923 B2 12/2011 Blanco
8,075,000 B2 12/2011 James et al.
8,075,661 B2 12/2011 Chen
8,083,506 B2 12/2011 Maki
8,100,407 B2 1/2012 Stanton
8,141,849 B1 3/2012 Blume
8,146,889 B2 4/2012 Hunter
8,147,227 B1 4/2012 Blume
8,181,970 B2 5/2012 Smith
8,201,832 B2 6/2012 Kocurek
8,261,771 B2 9/2012 Witkowski
8,287,256 B2 10/2012 Shafer
8,291,927 B2 10/2012 Johnson
8,292,301 B1 10/2012 Gilstad et al.
8,312,805 B1 11/2012 Blume
8,317,498 B2 11/2012 Gambier
8,328,202 B2 12/2012 Foster et al.
8,375,980 B2 2/2013 Higashiyama
8,376,723 B2 2/2013 Kugelev
8,402,880 B2 3/2013 Patel
8,408,886 B2 4/2013 Fabbri
8,430,075 B2 4/2013 Qiao
D687,125 S 7/2013 Hawes
8,479,700 B2 7/2013 Qiao
8,511,218 B2 8/2013 Cordes
8,511,219 B2 * 8/2013 Tackett ................. F04B 53/164
277/926
8,522,667 B2 9/2013 Clemens
8,528,585 B2 9/2013 McGuire
8,529,230 B1 9/2013 Colley, III et al.
8,534,691 B2 9/2013 Schaffer
8,613,886 B2 12/2013 Qiao
D700,682 S 3/2014 Bayyouk et al.
8,662,864 B2 3/2014 Bayyouk
8,662,865 B2 3/2014 Bayyouk
8,668,012 B2 3/2014 Porter et al.
8,668,470 B2 3/2014 Bayyouk
8,707,853 B1 4/2014 Dille
8,733,313 B2 5/2014 Sato
8,784,081 B1 7/2014 Blume
8,814,139 B2 8/2014 Griffin et al.
8,814,432 B2 8/2014 Thoma et al.
8,828,312 B2 9/2014 Yao
8,870,554 B2 10/2014 Kent
8,888,069 B2 11/2014 Maruno et al.
8,893,806 B2 11/2014 Williamson
8,894,392 B1 11/2014 Blume
8,915,722 B1 12/2014 Blume
8,940,110 B2 1/2015 Qiao
8,955,850 B2 2/2015 Saucerman et al.
8,978,695 B2 3/2015 Witkowkski
8,998,593 B2 4/2015 Vicars
9,010,412 B2 4/2015 McGuire
9,016,693 B1 4/2015 Shek et al.
9,067,346 B2 6/2015 Kohn et al.
9,103,448 B2 8/2015 Witkowski
9,121,503 B2 9/2015 Dietle et al.
9,150,945 B2 10/2015 Bei
9,157,136 B2 10/2015 Chou
9,157,297 B2 10/2015 Williamson, Jr.

(56) References Cited

U.S. PATENT DOCUMENTS 9,157,468 B2 10/2015 Dille
9,188,242 B2 11/2015 Giove et al.
9,206,910 B2 12/2015 Kahn
D748,228 S 1/2016 Bayyouk
9,243,630 B2 1/2016 Foote
9,260,933 B2 2/2016 Artherholt
9,261,195 B2 2/2016 Toynbee
9,273,543 B2 3/2016 Baca
9,284,631 B2 3/2016 Radon
9,284,953 B2 3/2016 Blume
9,285,040 B2 3/2016 Forrest
9,291,274 B1 3/2016 Blume
9,322,243 B2 4/2016 Baca
9,334,547 B2 5/2016 Qiao
9,340,856 B2 5/2016 Otobe
9,341,039 B2 5/2016 Galle et al.
9,341,272 B2 5/2016 Hoang
9,359,921 B2 6/2016 Hashimoto
9,360,115 B2 6/2016 Chaplin et al.
9,365,913 B2 6/2016 Imaizumi
9,371,919 B2 6/2016 Forrest
9,376,930 B2 6/2016 Kim
9,377,019 B1 6/2016 Blume
9,382,940 B2 7/2016 Lee
9,410,396 B2 8/2016 MØgedal
9,416,887 B2 8/2016 Blume
9,435,454 B2 9/2016 Blume
9,441,776 B2 9/2016 Bryne
9,458,743 B2 10/2016 Qiao
9,464,730 B2 10/2016 Bihlet
9,500,195 B2 11/2016 Blume
9,506,382 B2 11/2016 Yeager
9,528,349 B2 12/2016 Zimmerman
9,528,508 B2 12/2016 Thomeer
9,528,631 B2 12/2016 McCarty
9,534,473 B2 1/2017 Morris
9,534,691 B2 1/2017 Miller
9,556,761 B2 1/2017 Koyama
9,568,138 B2 2/2017 Arizpe
9,605,767 B2 3/2017 Chhabra
9,631,739 B2 4/2017 Belshan
D787,029 S 5/2017 Bayyouk
9,638,075 B2 5/2017 Qiao
9,638,337 B2 5/2017 Witkowski
9,650,882 B2 5/2017 Zhang
9,651,067 B2 5/2017 Beschorner
9,677,378 B2 6/2017 Asthana et al.
9,689,364 B2 6/2017 Mack
9,695,812 B2 7/2017 Dille
9,732,746 B2 8/2017 Chandrasekaran
9,732,880 B2 8/2017 Haines
9,745,968 B2 8/2017 Kotapish
9,784,262 B2 10/2017 Bayyouk
9,791,082 B2 10/2017 Baxter et al.
9,816,348 B2 11/2017 Asthana et al.
9,822,606 B2 11/2017 Williamson, Jr.
9,822,894 B2 11/2017 Bayyouk
9,845,801 B1 12/2017 Shek
9,857,807 B2 1/2018 Baca
9,915,250 B2 3/2018 Brasche
9,920,615 B2 3/2018 Zhang
9,927,036 B2 3/2018 Dille
9,945,362 B2 4/2018 Skurdalsvold
9,945,375 B2 4/2018 Zhang
9,957,770 B2 5/2018 Averill et al.
9,976,401 B2 5/2018 Walton et al.
9,989,044 B2 6/2018 Bayyouk
10,029,540 B2 7/2018 Seeger
D826,281 S 8/2018 Mead
10,041,490 B1 8/2018 Jahnke
10,082,137 B2 9/2018 Graham
10,094,478 B2 10/2018 Iijima
10,113,679 B2 10/2018 Shuck
10,145,205 B2 12/2018 Martino et al.
10,180,058 B2 1/2019 Carter
10,184,470 B2 1/2019 Barnett, Jr.
10,190,197 B2 1/2019 Baker
10,197,172 B2 2/2019 Fuller
10,203,037 B2 2/2019 Hunter et al.
10,215,172 B2 2/2019 Wood
10,221,848 B2 3/2019 Bayyouk
10,240,594 B2 3/2019 Barnhouse, Jr.
10,240,597 B2 3/2019 Bayyouk
10,247,182 B2 4/2019 Zhang
10,247,184 B2 4/2019 Chunn
10,260,634 B2 4/2019 Lenhert et al.
10,273,954 B2 4/2019 Brown
10,288,178 B2 5/2019 Nowell
10,309,182 B2 6/2019 Jones et al.
10,316,832 B2 6/2019 Byrne
10,330,097 B2 6/2019 Skurdalsvold
10,344,757 B1 7/2019 Stark
10,364,487 B2 7/2019 Park
D856,498 S 8/2019 Bayyouk
10,378,535 B2 8/2019 Mahmood
10,378,538 B2 8/2019 Blume
10,378,659 B2 8/2019 Scott et al.
10,393,113 B2 8/2019 Wagner
10,400,764 B2 9/2019 Wagner
10,415,348 B2 9/2019 Zhang
10,415,719 B2 9/2019 Leboeuf et al.
D861,834 S 10/2019 Foster et al.
D864,691 S 10/2019 Campos
10,428,406 B2 10/2019 Yao
10,428,949 B2 10/2019 Miller
10,435,987 B2 10/2019 Poluchalla et al.
10,436,193 B1 10/2019 Jahnke
10,443,456 B2 10/2019 Hoeg
10,465,680 B1 11/2019 Guerra
10,472,702 B2 11/2019 Yeh
10,487,528 B2 11/2019 Pozybill
D871,455 S 12/2019 Crowsley
10,519,070 B2 12/2019 Sanders
10,519,950 B2 12/2019 Foster
10,526,862 B2 1/2020 Witkowski
10,527,036 B2 1/2020 Blume
10,533,240 B2 1/2020 Veliz et al.
10,557,446 B2 2/2020 Stecklein
10,557,576 B2 2/2020 Witkowski
10,557,580 B2 2/2020 Mendyk
10,563,494 B2 2/2020 Graham
10,563,649 B2 2/2020 Zhang
10,570,491 B2 2/2020 Hong
10,576,538 B2 3/2020 Kato
10,577,580 B2 3/2020 Abbas
10,577,850 B2 3/2020 Ozkan
10,591,070 B2 3/2020 Nowell
10,605,374 B2 3/2020 Takaki
D880,661 S 4/2020 Foster et al.
D881,958 S 4/2020 Han
10,626,856 B2 4/2020 Coldren
10,628,744 B2 4/2020 Surjaatmadja et al.
10,633,925 B2 4/2020 Panda
10,634,260 B2 4/2020 Said
10,640,854 B2 5/2020 Hu
10,655,623 B2 5/2020 Blume
10,655,743 B2 5/2020 Hagen
10,663,071 B2 5/2020 Bayyouk
10,670,013 B2 6/2020 Foster
10,670,153 B2 6/2020 Filipow
10,670,176 B2 6/2020 Byrne
10,677,109 B2 6/2020 Qiao
10,677,240 B2 6/2020 Graham
10,677,365 B2 6/2020 Said
10,711,567 B2 7/2020 Buckley
10,711,754 B2 7/2020 Nelson
10,711,778 B2 7/2020 Buckley
10,718,441 B2 7/2020 Myers
D893,684 S 8/2020 Matthys
10,731,523 B2 8/2020 Qu
10,731,643 B2 8/2020 DeLeon
10,738,928 B2 8/2020 Arizpe
10,753,490 B2 8/2020 Fuller
10,753,495 B2 8/2020 Bayyouk

(56) References Cited

U.S. PATENT DOCUMENTS

| | | | |
|---|---|---|---|
| D895,777 | S | 9/2020 | Chase |
| 10,760,567 | B2 | 9/2020 | Salih et al. |
| 10,767,520 | B1 | 9/2020 | Hattiangadi |
| 10,771,567 | B2 | 9/2020 | Sundaresan |
| 10,774,828 | B1 | 9/2020 | Smith |
| 10,781,803 | B2 | 9/2020 | Kumar |
| 10,787,725 | B2 | 9/2020 | Fujieda |
| 10,801,627 | B2 | 10/2020 | Warbey |
| 10,808,488 | B2 | 10/2020 | Witkowski |
| 10,808,851 | B1 | 10/2020 | Surjaatmadja et al. |
| 10,815,988 | B2 | 10/2020 | Buckley |
| 10,815,989 | B2 | 10/2020 | Naedler et al. |
| 10,830,360 | B2 | 11/2020 | Frank |
| 10,837,556 | B2 | 11/2020 | Chase et al. |
| 10,851,775 | B2 | 12/2020 | Stark |
| 10,865,325 | B2 | 12/2020 | Nakao |
| 10,895,325 | B2 | 1/2021 | Nowell et al. |
| D910,820 | S | 2/2021 | Grassl |
| 10,907,738 | B2 | 2/2021 | Nowell |
| 10,914,171 | B2 | 2/2021 | Foster |
| 10,914,383 | B2 | 2/2021 | Kustermans et al. |
| 10,934,899 | B2 | 3/2021 | Hattiangadi |
| 10,941,765 | B2 | 3/2021 | Nowell |
| 10,941,866 | B2 | 3/2021 | Nowell |
| 10,954,938 | B2 | 3/2021 | Stark |
| 10,961,607 | B2 | 3/2021 | Oshima |
| 10,962,001 | B2 | 3/2021 | Nowell |
| D915,197 | S | 4/2021 | Katano |
| D916,240 | S | 4/2021 | Nowell |
| 10,968,717 | B2 | 4/2021 | Tran |
| 10,988,834 | B2 | 4/2021 | Lee |
| 10,989,321 | B2 | 4/2021 | Hattiangadi |
| 10,995,738 | B2 | 5/2021 | Blume |
| 11,002,120 | B1 | 5/2021 | Surjaatmadja |
| 11,009,016 | B2 | 5/2021 | Berend |
| 11,028,662 | B2 | 6/2021 | Rhodes |
| 11,041,570 | B1 | 6/2021 | Buckley |
| 11,073,144 | B1 | 7/2021 | Hurst et al. |
| 11,078,903 | B2 | 8/2021 | Nowell |
| 11,104,981 | B2 | 8/2021 | Chen |
| 11,105,185 | B2 | 8/2021 | Spencer |
| 11,105,327 | B2 | 8/2021 | Hurst |
| 11,105,328 | B2 | 8/2021 | Bryne |
| 11,105,428 | B2 | 8/2021 | Warbey |
| 11,111,915 | B2 | 9/2021 | Bayyouk |
| 11,131,397 | B2 | 9/2021 | Yan |
| D933,104 | S | 10/2021 | Ellisor |
| D933,105 | S | 10/2021 | Ellisor |
| D933,106 | S | 10/2021 | Mullins |
| D933,107 | S | 10/2021 | Mullins |
| 11,143,305 | B1 | 10/2021 | Matthys |
| 11,149,514 | B2 | 10/2021 | Witkowski |
| 11,149,856 | B2 | 10/2021 | Mattoni et al. |
| 11,156,221 | B2 | 10/2021 | Stark et al. |
| 11,162,479 | B2 | 11/2021 | Thomas et al. |
| 11,162,859 | B2 | 11/2021 | Lei |
| 11,173,590 | B2 | 11/2021 | Tyler |
| 11,181,101 | B2 | 11/2021 | Byrne |
| 11,181,108 | B2 | 11/2021 | Brooks |
| 11,225,963 | B2 | 1/2022 | Naedler et al. |
| 11,231,111 | B2 | 1/2022 | Hurst |
| 11,242,849 | B1 | 2/2022 | Smith |
| 11,286,737 | B2 | 3/2022 | Gunasekaran |
| D949,202 | S | 4/2022 | Sharpstone |
| 11,300,111 | B2 | 4/2022 | Thomas et al. |
| 11,313,189 | B2 | 4/2022 | Dawsey et al. |
| 11,333,249 | B2 | 5/2022 | Jones et al. |
| 11,353,117 | B1 | 6/2022 | Smith |
| 11,359,615 | B2 | 6/2022 | Thomas et al. |
| 11,384,756 | B1 | 7/2022 | Smith |
| 11,391,374 | B1 | 7/2022 | Ellisor |
| 11,421,679 | B1 | 8/2022 | Mullins |
| 11,421,680 | B1 | 8/2022 | Smith |
| 11,434,714 | B2 | 9/2022 | Machocki |
| 11,434,900 | B1 | 9/2022 | Alex |
| 11,441,683 | B2 | 9/2022 | Mullins et al. |
| 11,454,083 | B2 | 9/2022 | Asthana et al. |
| 11,454,321 | B2 | 9/2022 | Mullins et al. |
| 11,473,395 | B2 | 10/2022 | Yeldell et al. |
| 11,473,686 | B2 | 10/2022 | Bayyouk |
| 11,512,545 | B2 | 11/2022 | Yuan et al. |
| 11,519,225 | B2 | 12/2022 | Winslow et al. |
| 11,566,481 | B2 | 1/2023 | Chambers et al. |
| 11,566,713 | B2 | 1/2023 | Poremski |
| 11,566,718 | B2 | 1/2023 | Singley et al. |
| D980,876 | S | 3/2023 | Smith |
| 11,608,896 | B2 | 3/2023 | Al-Darra |
| D986,928 | S | 5/2023 | Smith et al. |
| 11,644,106 | B2 | 5/2023 | Williams et al. |
| 11,668,163 | B2 | 6/2023 | Asthana et al. |
| 11,692,544 | B2 | 7/2023 | Chase |
| D997,992 | S | 9/2023 | Smith et al. |
| 11,746,778 | B2 | 9/2023 | Bayyouk |
| 11,761,441 | B1 | 9/2023 | Alex et al. |
| D1,006,059 | S | 11/2023 | Waniek |
| 11,840,453 | B2 | 12/2023 | Vlassoff et al. |
| 11,846,356 | B1 | 12/2023 | Ellisor |
| 11,859,723 | B2 | 1/2024 | Surjaatmadja et al. |
| 11,891,988 | B2 | 2/2024 | Mullins et al. |
| 11,898,408 | B2 | 2/2024 | Jamison et al. |
| 11,913,447 | B1 | 2/2024 | Wiegand et al. |
| 11,920,684 | B1 | 3/2024 | Xu et al. |
| 11,938,592 | B2 | 3/2024 | Dearborn et al. |
| D1,022,145 | S | 4/2024 | Meyers |
| 11,952,865 | B2 | 4/2024 | Fripp et al. |
| 11,988,294 | B2 | 5/2024 | Qiao et al. |
| D1,031,952 | S | 6/2024 | Huntley |
| 12,018,759 | B1 | 6/2024 | Patel et al. |
| D1,036,632 | S | 7/2024 | Suzuki |
| 12,038,086 | B2 | 7/2024 | Shuck |
| 12,049,889 | B2 | 7/2024 | Ellisor et al. |
| D1,039,657 | S | 8/2024 | Cox |
| 12,055,221 | B2 | 8/2024 | Ellisor et al. |
| 12,092,226 | B2 | 9/2024 | Elliott et al. |
| 12,092,227 | B1 | 9/2024 | Belshan |
| 12,140,005 | B2 | 11/2024 | Brown et al. |
| 12,140,240 | B1 | 11/2024 | Xu |
| D1,061,623 | S | 2/2025 | Newberg et al. |
| D1,063,005 | S | 2/2025 | Lorkowski |
| 12,247,557 | B2 | 3/2025 | Avey et al. |
| 12,247,561 | B2 | 3/2025 | Avey et al. |
| 12,263,503 | B2 | 4/2025 | Mittag et al. |
| 12,263,549 | B2 | 4/2025 | Noreiga et al. |
| 12,270,394 | B2 | 4/2025 | Ellisor et al. |
| 12,270,477 | B2 | 4/2025 | Pauchet et al. |
| 12,292,120 | B1 | 5/2025 | Mullins et al. |
| 12,292,121 | B2 | 5/2025 | Berryhill |
| 12,297,922 | B1 | 5/2025 | Xu |
| 12,345,253 | B2 | 7/2025 | Mullins et al. |
| 12,345,332 | B2 | 7/2025 | Ellisor |
| 12,366,244 | B2 | 7/2025 | Alex et al. |
| 12,366,245 | B1 | 7/2025 | Ellisor et al. |
| 12,404,931 | B2 | 9/2025 | Ellisor et al. |
| 12,404,942 | B2 | 9/2025 | Hurst et al. |
| 12,460,488 | B2 | 11/2025 | Uddin et al. |
| 12,473,910 | B2 | 11/2025 | Foster et al. |
| 12,480,489 | B2 | 11/2025 | Ellisor et al. |
| 12,486,901 | B1 | 12/2025 | Naedler |
| 12,498,051 | B2 | 12/2025 | Xu et al. |
| 12,510,164 | B1 | 12/2025 | Mullins et al. |
| D1,113,987 | S | 2/2026 | Mullins et al. |
| 12,540,673 | B2 | 2/2026 | Ellisor |
| 12,669,191 | B1 | 6/2026 | Xu |
| 12,692,945 | B2 | 7/2026 | Mullins et al. |
| 2002/0084004 | A1 | 7/2002 | Takahashi |
| 2002/0124961 | A1 | 9/2002 | Porter |
| 2002/0159914 | A1 | 10/2002 | Yeh |
| 2003/0205864 | A1 | 11/2003 | Dietle |
| 2003/0233910 | A1 | 12/2003 | Jeong |
| 2004/0108116 | A1 | 6/2004 | McLoughlin et al. |
| 2004/0161351 | A1 | 8/2004 | Forrest |
| 2004/0170507 | A1 | 9/2004 | Vicars |
| 2004/0194576 | A1 | 10/2004 | Ando |
| 2004/0234404 | A1 | 11/2004 | Vicars |

(56) References Cited

U.S. PATENT DOCUMENTS

| | | | |
|---|---|---|---|
| 2004/0255410 | A1 | 12/2004 | Schonewille |
| 2004/0258557 | A1 | 12/2004 | Shun |
| 2005/0095156 | A1 | 5/2005 | Wolters |
| 2005/0098963 | A1 | 5/2005 | Olsen |
| 2005/0126638 | A1 | 6/2005 | Gilbert |
| 2005/0200081 | A1 | 9/2005 | Stanton |
| 2005/0226754 | A1 | 10/2005 | Orr |
| 2006/0002806 | A1 | 1/2006 | Baxter |
| 2006/0027779 | A1 | 2/2006 | McGuire |
| 2006/0045782 | A1 | 3/2006 | Kretzinger |
| 2007/0086910 | A1 | 4/2007 | Liang |
| 2007/0154342 | A1 | 7/2007 | Tu |
| 2007/0261746 | A1 | 11/2007 | Nomichi et al. |
| 2007/0273105 | A1 | 11/2007 | Stanton |
| 2007/0295411 | A1 | 12/2007 | Schwegman |
| 2008/0031769 | A1 | 2/2008 | Yeh |
| 2008/0042369 | A1 | 2/2008 | Krywitsky et al. |
| 2008/0052014 | A1 | 2/2008 | Toyosada |
| 2008/0092384 | A1 | 4/2008 | Schaake |
| 2008/0240949 | A1 | 10/2008 | Tackett et al. |
| 2008/0279706 | A1 | 11/2008 | Gambier |
| 2009/0041611 | A1 | 2/2009 | Sathian |
| 2009/0166980 | A1 | 7/2009 | Miller et al. |
| 2009/0261575 | A1 | 10/2009 | Bull |
| 2009/0278069 | A1 | 11/2009 | Blanco |
| 2009/0289209 | A1 | 11/2009 | Comeaux et al. |
| 2010/0143163 | A1 | 6/2010 | Patel et al. |
| 2010/0230628 | A1 | 9/2010 | Stefina |
| 2010/0242720 | A1 | 9/2010 | Matzner |
| 2010/0272597 | A1 | 10/2010 | Qiao |
| 2011/0079302 | A1 | 4/2011 | Hawes |
| 2011/0142701 | A1 | 6/2011 | Small |
| 2011/0173814 | A1 | 7/2011 | Patel |
| 2011/0189040 | A1 | 8/2011 | Vicars |
| 2011/0255993 | A1 | 10/2011 | Ochoa |
| 2011/0266752 | A1 | 11/2011 | Kocurek |
| 2011/0296982 | A1 | 12/2011 | Dille et al. |
| 2012/0141308 | A1 | 6/2012 | Saini |
| 2012/0157786 | A1 | 6/2012 | Pribanic |
| 2012/0163969 | A1 | 6/2012 | Ongole |
| 2012/0259593 | A1 | 10/2012 | El-Zein |
| 2012/0292550 | A1 | 11/2012 | Meek |
| 2012/0304821 | A1 | 12/2012 | Ando |
| 2013/0020521 | A1 | 1/2013 | Byrne |
| 2013/0037739 | A1 | 2/2013 | Millard |
| 2013/0202457 | A1 | 8/2013 | Bayyouk |
| 2013/0202458 | A1 | 8/2013 | Byrne |
| 2013/0263932 | A1 | 10/2013 | Baxter et al. |
| 2013/0319220 | A1 | 12/2013 | Luharuka |
| 2014/0083541 | A1 | 3/2014 | Chandrasekaran |
| 2014/0083547 | A1 | 3/2014 | Hwang |
| 2014/0196883 | A1 | 7/2014 | Artherholt |
| 2014/0260954 | A1 | 9/2014 | Young |
| 2014/0264134 | A1 | 9/2014 | Butler et al. |
| 2014/0286805 | A1 | 9/2014 | Dyer |
| 2014/0319780 | A1 | 10/2014 | Vertenten |
| 2014/0322034 | A1 | 10/2014 | Bayyouk |
| 2014/0322050 | A1 | 10/2014 | Marette et al. |
| 2014/0348677 | A1 | 11/2014 | Moeller |
| 2015/0060715 | A1 | 3/2015 | Hoang |
| 2015/0127308 | A1 | 5/2015 | Thomas, Jr. et al. |
| 2015/0132157 | A1 | 5/2015 | Whaley |
| 2015/0144826 | A1 | 5/2015 | Bayyouk |
| 2015/0147194 | A1 | 5/2015 | Foote |
| 2015/0219096 | A1 | 8/2015 | Jain |
| 2015/0300332 | A1 | 10/2015 | Kotapish |
| 2015/0353856 | A1 | 12/2015 | Kleyman et al. |
| 2015/0368775 | A1 | 12/2015 | Baker |
| 2015/0377356 | A1 | 12/2015 | Miller |
| 2016/0097459 | A1 | 4/2016 | Veliz et al. |
| 2016/0201169 | A1 | 7/2016 | Vecchio |
| 2016/0215588 | A1 | 7/2016 | Belshan |
| 2016/0238156 | A1 | 8/2016 | Hubenschmidt |
| 2016/0245280 | A1 | 8/2016 | Todorov |
| 2016/0258433 | A1 | 9/2016 | Belshan et al. |
| 2016/0319626 | A1 | 11/2016 | Dille |
| 2016/0319805 | A1 | 11/2016 | Dille |
| 2016/0327165 | A1 | 11/2016 | Sundararajan |
| 2017/0051738 | A1 | 2/2017 | Horning |
| 2017/0067459 | A1 | 3/2017 | Bayyouk |
| 2017/0089334 | A1 | 3/2017 | Jahnke |
| 2017/0089470 | A1 | 3/2017 | Filipow et al. |
| 2017/0089473 | A1 | 3/2017 | Nowell |
| 2017/0097107 | A1 | 4/2017 | Hotz |
| 2017/0102101 | A1 | 4/2017 | Duval-Arnould |
| 2017/0122055 | A1 | 5/2017 | Embury |
| 2017/0159655 | A1 | 6/2017 | Morreale |
| 2017/0175799 | A1 | 6/2017 | Arnold |
| 2017/0204852 | A1 | 7/2017 | Barnett, Jr. |
| 2017/0211708 | A1 | 7/2017 | Kim |
| 2017/0218951 | A1 | 8/2017 | Graham |
| 2017/0218993 | A1 | 8/2017 | Freed |
| 2017/0268674 | A1 | 9/2017 | Barbera et al. |
| 2017/0297149 | A1 | 10/2017 | Shinohara |
| 2017/0298932 | A1 | 10/2017 | Wagner |
| 2017/0314097 | A1 | 11/2017 | Hong |
| 2017/0342776 | A1 | 11/2017 | Bullock |
| 2017/0342976 | A1 | 11/2017 | Reddy |
| 2018/0017173 | A1 | 1/2018 | Nowell |
| 2018/0045318 | A1 | 2/2018 | Tanida |
| 2018/0058431 | A1 | 3/2018 | Blume |
| 2018/0073653 | A1 | 3/2018 | Bayyouk |
| 2018/0073654 | A1 | 3/2018 | Nowell et al. |
| 2018/0156212 | A1 | 6/2018 | Ballario |
| 2018/0202434 | A1 | 7/2018 | Barnhouse, Jr. |
| 2018/0238459 | A1 | 8/2018 | Nowell et al. |
| 2018/0258721 | A1 | 9/2018 | Pawar et al. |
| 2018/0298481 | A1 | 10/2018 | Kleyman et al. |
| 2018/0298894 | A1 | 10/2018 | Wagner |
| 2018/0312946 | A1 | 11/2018 | Gigliotti, Jr. |
| 2018/0320258 | A1 | 11/2018 | Stewart |
| 2018/0340245 | A1 | 11/2018 | Kernion |
| 2018/0354081 | A1 | 12/2018 | Kalyani |
| 2018/0363642 | A1 | 12/2018 | Salih et al. |
| 2019/0011051 | A1 | 1/2019 | Yeung |
| 2019/0017503 | A1 | 1/2019 | Foster |
| 2019/0024198 | A1 | 1/2019 | Hong |
| 2019/0024225 | A1 | 1/2019 | Tang |
| 2019/0032685 | A1 | 1/2019 | Foster |
| 2019/0032720 | A1 | 1/2019 | Bayyouk |
| 2019/0040966 | A1 | 2/2019 | Myers et al. |
| 2019/0047049 | A1 | 2/2019 | Fujieda |
| 2019/0049052 | A1 | 2/2019 | Shuck |
| 2019/0063427 | A1 | 2/2019 | Nowell |
| 2019/0063430 | A1 | 2/2019 | Byrne |
| 2019/0071755 | A1 | 3/2019 | Lee |
| 2019/0072088 | A1 | 3/2019 | DeLeon |
| 2019/0072089 | A1 | 3/2019 | Buckley |
| 2019/0085806 | A1 | 3/2019 | Meibgeier |
| 2019/0085978 | A1 | 3/2019 | Chase |
| 2019/0101109 | A1 | 4/2019 | Cortes |
| 2019/0107226 | A1 | 4/2019 | Bayyouk |
| 2019/0120389 | A1 | 4/2019 | Foster |
| 2019/0136842 | A1 | 5/2019 | Nowell |
| 2019/0145400 | A1 | 5/2019 | Graham |
| 2019/0145568 | A1 | 5/2019 | Nick |
| 2019/0154033 | A1 | 5/2019 | Brooks |
| 2019/0170137 | A1 | 6/2019 | Chase |
| 2019/0170138 | A1 | 6/2019 | Bayyouk |
| 2019/0194786 | A1 | 6/2019 | Chuang |
| 2019/0226058 | A1 | 7/2019 | Fujieda |
| 2019/0226476 | A1 | 7/2019 | Stark et al. |
| 2019/0242373 | A1 | 8/2019 | Wernig |
| 2019/0247957 | A1 | 8/2019 | Stribling |
| 2019/0264683 | A1 | 8/2019 | Smith |
| 2019/0292633 | A1 | 9/2019 | Porret |
| 2019/0301314 | A1 | 10/2019 | Kamo |
| 2019/0301447 | A1 | 10/2019 | Skurdalsvold |
| 2019/0316685 | A1 | 10/2019 | Wang |
| 2019/0331245 | A1 | 10/2019 | Gable et al. |
| 2019/0360483 | A1 | 11/2019 | Nowell |
| 2019/0368614 | A1 | 12/2019 | Hurst |
| 2019/0368619 | A1 | 12/2019 | Barnett et al. |
| 2019/0376508 | A1 | 12/2019 | Wagner |

(56) References Cited

U.S. PATENT DOCUMENTS

| | | | |
|---|---|---|---|
| 2020/0041001 | A1 | 2/2020 | Minami |
| 2020/0056272 | A1 | 2/2020 | Hong |
| 2020/0063899 | A1 | 2/2020 | Witkowski |
| 2020/0070034 | A1 | 3/2020 | Sukup et al. |
| 2020/0072369 | A1 | 3/2020 | Singley et al. |
| 2020/0080660 | A1 | 3/2020 | Dyer |
| 2020/0080661 | A1 | 3/2020 | Mullins |
| 2020/0132195 | A1 | 4/2020 | Coombs |
| 2020/0157663 | A1 | 5/2020 | Yang |
| 2020/0158123 | A1 | 5/2020 | Chen |
| 2020/0173317 | A1 | 6/2020 | Keating |
| 2020/0182240 | A1 | 6/2020 | Nowell et al. |
| 2020/0208776 | A1 | 7/2020 | Bayyouk |
| 2020/0217424 | A1 | 7/2020 | Rasmussen |
| 2020/0232455 | A1 | 7/2020 | Blume |
| 2020/0240531 | A1 | 7/2020 | Nowell |
| 2020/0256149 | A1 | 8/2020 | Witkowski |
| 2020/0284253 | A1 | 9/2020 | Foster |
| 2020/0284365 | A1 | 9/2020 | Bayyouk |
| 2020/0290118 | A1 | 9/2020 | Chen |
| 2020/0291731 | A1 | 9/2020 | Haiderer |
| 2020/0300240 | A1 | 9/2020 | Nowell |
| 2020/0300367 | A1 | 9/2020 | Caglio et al. |
| 2020/0308683 | A1 | 10/2020 | Xue |
| 2020/0340314 | A1 | 10/2020 | Yeldell et al. |
| 2020/0347843 | A1 | 11/2020 | Mullins |
| 2020/0355182 | A1 | 11/2020 | DeLeon |
| 2020/0362970 | A1 | 11/2020 | Hurst |
| 2020/0362975 | A1 | 11/2020 | Hurst et al. |
| 2020/0386223 | A1 | 12/2020 | Hurst |
| 2020/0392613 | A1 | 12/2020 | Won |
| 2020/0393054 | A1 | 12/2020 | Fuller |
| 2020/0399979 | A1 | 12/2020 | Webster |
| 2020/0400003 | A1 | 12/2020 | Webster |
| 2020/0400130 | A1 | 12/2020 | Poehls |
| 2020/0400132 | A1 | 12/2020 | Kumar |
| 2020/0400140 | A1 | 12/2020 | Bayyouk |
| 2020/0400234 | A1 | 12/2020 | Mullins et al. |
| 2020/0400242 | A1 | 12/2020 | Spencer |
| 2021/0010113 | A1 | 1/2021 | Qiao |
| 2021/0010470 | A1 | 1/2021 | Blume |
| 2021/0017830 | A1 | 1/2021 | Witkowski |
| 2021/0017982 | A1 | 1/2021 | Bayyouk |
| 2021/0017983 | A1 | 1/2021 | Myers |
| 2021/0025497 | A1 | 1/2021 | Tsuji |
| 2021/0040836 | A1 | 2/2021 | Baskin |
| 2021/0054486 | A1 | 2/2021 | Kim |
| 2021/0062944 | A1 | 3/2021 | Lee |
| 2021/0102630 | A1 | 4/2021 | Nowell |
| 2021/0108734 | A1 | 4/2021 | Nowell |
| 2021/0130936 | A1 | 5/2021 | Wu |
| 2021/0146397 | A1 | 5/2021 | Mittag et al. |
| 2021/0148471 | A1 | 5/2021 | Murugesan |
| 2021/0180156 | A1 | 6/2021 | Kim |
| 2021/0190053 | A1 | 6/2021 | Wagner |
| 2021/0190223 | A1 | 6/2021 | Bayyouk |
| 2021/0197524 | A1 | 7/2021 | Maroli |
| 2021/0215071 | A1 | 7/2021 | Oikawa |
| 2021/0215154 | A1 | 7/2021 | Nowell |
| 2021/0222690 | A1 | 7/2021 | Beisel |
| 2021/0230987 | A1 | 7/2021 | Tanner |
| 2021/0239111 | A1 | 8/2021 | Zitting |
| 2021/0246537 | A1 | 8/2021 | Maroli |
| 2021/0260704 | A1 | 8/2021 | Hu |
| 2021/0270261 | A1 | 9/2021 | Zhang |
| 2021/0285551 | A1 | 9/2021 | Renollett |
| 2021/0310484 | A1 | 10/2021 | Myers |
| 2021/0381504 | A1 | 12/2021 | Wagner |
| 2021/0381615 | A1 | 12/2021 | Riedel |
| 2021/0388832 | A1 | 12/2021 | Byrne |
| 2022/0026326 | A1 | 1/2022 | Wang |
| 2022/0034402 | A1 | 2/2022 | Kiani |
| 2022/0056906 | A1 | 2/2022 | Lawson et al. |
| 2022/0065063 | A1 | 3/2022 | Xu et al. |
| 2022/0145934 | A1 | 5/2022 | Prevost et al. |
| 2022/0163031 | A1 | 5/2022 | Chase |
| 2022/0163032 | A1 | 5/2022 | Chase |
| 2022/0163118 | A1 | 5/2022 | Maffezzoli et al. |
| 2022/0186718 | A1 | 6/2022 | Peer |
| 2022/0205470 | A1 | 6/2022 | Asthana et al. |
| 2022/0243723 | A1 | 8/2022 | Herold et al. |
| 2022/0260161 | A1 | 8/2022 | Nowell et al. |
| 2022/0282719 | A1 | 9/2022 | Barnhouse |
| 2022/0320790 | A1 | 10/2022 | Demaratos |
| 2022/0333707 | A1 | 10/2022 | Ting et al. |
| 2022/0349472 | A1 | 11/2022 | Ellisor |
| 2022/0390055 | A1 | 12/2022 | Ellisor |
| 2022/0403839 | A1 | 12/2022 | Mullins |
| 2023/0041201 | A1 | 2/2023 | Myers et al. |
| 2023/0047066 | A1 | 2/2023 | Barnett |
| 2023/0129538 | A1 | 4/2023 | Miller et al. |
| 2023/0130824 | A1 | 4/2023 | Belshan et al. |
| 2023/0138338 | A1 | 5/2023 | Barnhouse et al. |
| 2023/0184241 | A1 | 6/2023 | Avey et al. |
| 2023/0220840 | A1 | 7/2023 | Avey et al. |
| 2023/0258175 | A1 | 8/2023 | Figgs et al. |
| 2023/0279991 | A1 | 9/2023 | Avey et al. |
| 2023/0313890 | A1 | 10/2023 | Foster et al. |
| 2023/0332596 | A1 | 10/2023 | Chase |
| 2023/0383743 | A1 | 11/2023 | Brock et al. |
| 2023/0383859 | A1 | 11/2023 | Wiegand et al. |
| 2023/0399961 | A1 | 12/2023 | Nogami |
| 2023/0407864 | A1 | 12/2023 | Alex et al. |
| 2024/0042627 | A1 | 2/2024 | Wang et al. |
| 2024/0102460 | A1 | 3/2024 | Kachovskiy et al. |
| 2024/0117882 | A1 | 4/2024 | Ellisor |
| 2024/0133277 | A1 | 4/2024 | Brown et al. |
| 2024/0200656 | A1 | 6/2024 | Avey |
| 2024/0200666 | A1 | 6/2024 | Leake |
| 2024/0209945 | A1 | 6/2024 | Prate et al. |
| 2024/0262067 | A1 | 8/2024 | Iversen et al. |
| 2024/0309724 | A1 | 9/2024 | Miller et al. |
| 2024/0369139 | A1 | 11/2024 | Ellisor |
| 2024/0369141 | A1 | 11/2024 | Patel et al. |
| 2024/0376892 | A1 | 11/2024 | Ellisor |
| 2024/0376984 | A1 | 11/2024 | Ellisor |
| 2024/0384795 | A1 | 11/2024 | Barnett et al. |
| 2024/0418164 | A1 | 12/2024 | Peer |
| 2024/0418282 | A1 | 12/2024 | Featherstone et al. |
| 2025/0027486 | A1 | 1/2025 | Alex et al. |
| 2025/0052325 | A1 | 2/2025 | Berryhill |
| 2025/0075818 | A1 | 3/2025 | Xu |
| 2025/0207574 | A1 | 6/2025 | Foster et al. |
| 2025/0237308 | A1 | 7/2025 | Ellisor |
| 2025/0251044 | A1 | 8/2025 | Berryhill |
| 2025/0257798 | A1 | 8/2025 | Zitting |
| 2025/0277487 | A1 | 9/2025 | Ellisor et al. |
| 2025/0283463 | A1 | 9/2025 | Mullins et al. |
| 2025/0283464 | A1 | 9/2025 | Ellisor et al. |
| 2025/0305586 | A1 | 10/2025 | Mullins et al. |
| 2025/0320866 | A1 | 10/2025 | Barnett et al. |
| 2026/0002531 | A1 | 1/2026 | Peer et al. |
| 2026/0043491 | A1 | 2/2026 | Xu et al. |
| 2026/0078474 | A1 | 3/2026 | Verma et al. |
| 2026/0078754 | A1 | 3/2026 | Verma et al. |
| 2026/0132850 | A1 | 5/2026 | Peer et al. |
| 2026/0146601 | A1 | 5/2026 | Alex |
| 2026/0168490 | A1 | 6/2026 | Verma |
| 2026/0226987 | A1 | 8/2026 | Alex et al. |
| 2026/0243252 | A1 | 8/2026 | Newberg et al. |
| 2026/0258868 | A1 | 9/2026 | Ellisor et al. |
| 2026/0260037 | A1 | 9/2026 | Berryhill |
| 2026/0275983 | A1 | 9/2026 | Alex et al. |
| 2026/0276098 | A1 | 9/2026 | Xu |

FOREIGN PATENT DOCUMENTS

| | | | |
|---|---|---|---|
| CN | 2637843 | Y | 9/2004 |
| CN | 200971972 | Y | 11/2007 |
| CN | 101169190 | A | 4/2008 |
| CN | 201149099 | | 11/2008 |
| CN | 201401518 | Y | 2/2010 |
| CN | 201412533 | Y | 2/2010 |
| CN | 201610950 | U | 10/2010 |

(56) References Cited

FOREIGN PATENT DOCUMENTS

| | | | |
|---|---|---|---|
| CN | 201621317 | U | 11/2010 |
| CN | 201687978 | U | 12/2010 |
| CN | 201705964 | U | 1/2011 |
| CN | 201705982 | U | 1/2011 |
| CN | 102212776 | A | 10/2011 |
| CN | 202182204 | U | 4/2012 |
| CN | 102537510 | A | 7/2012 |
| CN | 102748483 | | 10/2012 |
| CN | 202545162 | U | 11/2012 |
| CN | 102828141 | A | 12/2012 |
| CN | 202790585 | U | 3/2013 |
| CN | 202852048 | U | 4/2013 |
| CN | 202884071 | U | 4/2013 |
| CN | 202914795 | U | 5/2013 |
| CN | 103147718 | A | 6/2013 |
| CN | 203098370 | U | 7/2013 |
| CN | 203257342 | U | 10/2013 |
| CN | 203604686 | U | 5/2014 |
| CN | 204040978 | U | 12/2014 |
| CN | 104329464 | A | 2/2015 |
| CN | 104455529 | A | 3/2015 |
| CN | 104550926 | A | 4/2015 |
| CN | 204253915 | U | 4/2015 |
| CN | 204738957 | U | 11/2015 |
| CN | 204805591 | U | 11/2015 |
| CN | 205136660 | U | 4/2016 |
| CN | 205315253 | U | 6/2016 |
| CN | 106151558 | A | 11/2016 |
| CN | 205841808 | U | 12/2016 |
| CN | 106481831 | A | 3/2017 |
| CN | 206386512 | U | 8/2017 |
| CN | 206530720 | U | 9/2017 |
| CN | 206845939 | U | 1/2018 |
| CN | 107795698 | A | 3/2018 |
| CN | 108329035 | A | 7/2018 |
| CN | 208364190 | U | 1/2019 |
| CN | 208416485 | U | 1/2019 |
| CN | 208416492 | U | 1/2019 |
| CN | 109321864 | A | 2/2019 |
| CN | 109458326 | A | 3/2019 |
| CN | 109695727 | A | 4/2019 |
| CN | 209261799 | U | 8/2019 |
| CN | 209370028 | U | 9/2019 |
| CN | 110374522 | A | 10/2019 |
| CN | 209469613 | U | 10/2019 |
| CN | 110454586 | A | 11/2019 |
| CN | 209725279 | U | 12/2019 |
| CN | 209866424 | U | 12/2019 |
| CN | 111005695 | A | 4/2020 |
| CN | 111073186 | A | 4/2020 |
| CN | 111455306 | A | 7/2020 |
| CN | 111664087 | A | 9/2020 |
| CN | 111690923 | A | 9/2020 |
| CN | 211649111 | U | 10/2020 |
| CN | 212080181 | U | 12/2020 |
| CN | 212249951 | U | 12/2020 |
| CN | 212718129 | U | 3/2021 |
| CN | 102410194 | | 4/2021 |
| CN | 213236168 | U | 5/2021 |
| CN | 113634953 | A | 11/2021 |
| CN | 215172271 | U | 12/2021 |
| CN | 215334442 | U | 12/2021 |
| CN | 114196903 | A | 3/2022 |
| CN | 218523056 | U | 2/2023 |
| CN | 220082168 | U | 11/2023 |
| CN | 220320353 | U | 1/2024 |
| CN | 223434777 | U | 10/2025 |
| CN | 223459920 | U | 10/2025 |
| DE | 3126421 | | 1/1983 |
| DE | 112008000977 | T5 | 2/2010 |
| DE | 102009001560 | A1 | 9/2010 |
| DE | 202012104058 | U1 | 3/2014 |
| DE | 102019123225 | A1 | 3/2020 |
| EP | 0 414 955 | | 3/1991 |
| EP | 0520567 | A1 | 12/1992 |
| EP | 3336356 | A1 | 6/2018 |
| EP | 3696408 | A1 | 8/2020 |
| GB | 387341 | A | 1/1933 |
| GB | 2123100 | | 1/1986 |
| GB | 2240592 | | 8/1991 |
| IN | 79MA2001 | A | 9/2007 |
| JP | H08291376 | A | 11/1996 |
| JP | 4019476 | B2 | 12/2007 |
| JP | 2021025560 | A | 2/2021 |
| WO | 2015/077001 | | 5/2015 |
| WO | 2016/024939 | | 2/2016 |
| WO | 2016/045768 | | 3/2016 |
| WO | 2019/169312 | | 9/2019 |
| WO | 2020/180716 | | 9/2020 |
| WO | 2021195572 | | 9/2021 |
| WO | 2022167341 | A1 | 8/2022 |
| WO | 2024026432 | | 2/2024 |
| WO | 2024076786 | A1 | 4/2024 |
| WO | 2024/119019 | | 6/2024 |

OTHER PUBLICATIONS

Michael Agnes, Editor, Webster's New World College Dictionary, Fourth Edition, 1999, 5 pages.
WEIR SPM Oil & Gas, Grooveless Fluid End, 2008, 1 page.
WEIR SPM Oil & Gas, Weir SPM General Catalog, 2009, 40 pages.
WEIR SPM Oil & Gas, Well Service Pump Reference Guide, 2008, 55 pages.
Intellectual Ventures I LLC v VMWare, Inc., Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
Vulcan Industrial Holding, LLC et al. v. Kerr Machine Co. Case No. 4:21-cv-433, Document 1, Complaint for Declaratory Judgment of Patent Non-Infringement, Feb. 9, 2021, 17 pages.
Trilogy Enterprises, Inc., v. Trilogy Education Services, LLC, Case. No. 6: 19-cv-199-ADA-JCM, Document 35, Fifth Amended Scheduling Order, Sep. 8, 2020, 4 pages.
Dr. Corneliu Bolbocean v Baylor University, Case No. 6:19-CV-00465-ADA-JCM, Document 34, Scheduling Order, Apr. 6, 2020, 4 pages.
Kerr Machine Co., v Vulcan Energy Services, LLC, Vulcan Industrial Holdings, LLC, and Cizion, LLC d/b/a/ Vulcan Industrial Manufacturing, Case No. 6:21-CV-00044-ADA, Document 4, Plaintiff's Amended Complaint for Patent Infringement and Jury Demand, Jan. 19, 2021, 30 pages.
Kerr Machine Co., v Vulcan Energy Services, LLC, Vulcan Industrial Holdings, LLC, and Cizion, LLC d/b/a/ Vulcan Industrial Manufacturing, Case No. 6:21-CV-00044, Document 1, Plaintiff's Original Complaint for Patent Infringement and Jury Demand, Jan. 19, 2021, 47 pages.
Kerr Machine Co., v Vulcan Energy Services, LLC, Vulcan Industrial Holdings, LLC, and Cizion, LLC d/b/a/ Vulcan Industrial Manufacturing, Case No. 6:21-CV-00044-ADA, Document 10, Plaintiff's Second Amended Complaint for Patent Infringement and Jury Demand, Feb. 1, 2021, 88 pages.
Kerr Machine Co., v Vulcan Industrial Holdings, LLC, Vulcan Energy Services, LLC, Cizion, LLC, Case No. W-20-CV-00200-ADA-24, Order Setting Trial Date, Jun. 14, 2020, 1 page.
Kerr Machine Co., v Vulcan Industrial Holdings, LLC, Vulcan Energy Services, LLC, Cizion, LLC, Case No. W-20-CV-00200-ADA-29, Order Setting Trial Date, Aug. 2, 2020, 1 page.
Kerr Machine Co., v. Vulcan Industrial Holdings, LLC, Case. No. 6:20-CV-00200-ADA, Affidavit of Service, Apr. 7, 2020, 1 page.
Kerr Machine Co., v Vulcan Industrial Holdings, LLC, Vulcan Energy Services, LLC, and Cizion, LLC d/b/a/ Vulcan Industrial Manufacturing, Case No. 6:20-CV-00200-ADA, Plaintiff's First Amended Complaint for Patent Infringement and Jury Demand, Jun. 4, 2020, 11 pages.
Kerr Machine Co., v Vulcan Industrial Holdings, LLC, Vulcan Energy Services, LLC, and Cizion, LLC d/b/a/ Vulcan Industrial Manufacturing, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.

(56) References Cited

OTHER PUBLICATIONS

Kerr Machine Co., v Vulcan Industrial Holdings, LLC, Vulcan Energy Services, LLC, and Cizion, LLC d/b/a/ Vulcan Industrial Manufacturing, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
Kerr Machine Co., v Vulcan Industrial Holdings, LLC, Case No. 6:20-CV-00200-ADA, Plaintiff's Preliminary Infringement Contentions, May 22, 2020, 50 pages.
Kerr Machine Co., v Vulcan Industrial Holdings, LLC, Vulcan Energy Services, LLC, and Cizion, LLC d/b/a/ Vulcan Industrial Manufacturing, Case No. 6:20-CV-00200-ADA, Defendants' Preliminary Invalidity Contentions, Aug. 13, 2020, 29 pages.
Kerr Machine Co., v Vulcan Industrial Holdings, LLC, Vulcan Energy Services, LLC, and Cizion, LLC d/b/a/ Vulcan Industrial Manufacturing, Case No. 6:20-CV-00200-ADA, Document 34, Scheduling Order, Aug. 11, 2020, 3 pages.
Kerr Machine Co., v Vulcan Industrial Holdings, LLC, Vulcan Energy Services, LLC, and Cizion, LLC d/b/a/ Vulcan Industrial Manufacturing, Case No. 6:20-CV-00200-ADA, Document 38, Plaintiff's Second Amended Complaint for Patent Infringement and Jury Demand, Sep. 25, 2020, 11 pages.
Kerr Machine Co., v Vulcan Industrial Holdings, LLC, Vulcan Energy Services, LLC, and Cizion, LLC d/b/a/ Vulcan Industrial Manufacturing, Case No. 6:20-CV-00200-ADA, Document 5, Standing Order regarding Scheduled Hearings in Civil Cases in Light of Chief Judge Garcia's 24 Amended Order, Mar. 24, 2020, 4 pages.
Kerr Machine Co., v Vulcan Industrial Holdings, LLC, Vulcan Energy Services, LLC, and Cizion, LLC d/b/a/ Vulcan Industrial Manufacturing, Civil Docket for Case No. 6:20-cv-00200-ADA, accessed Sep. 11, 2020, 7 pages.
Kerr Machine Co., v Vulcan Industrial Holdings, LLC, Vulcan Energy Services, LLC, and Cizion, LLC d/b/a/ Vulcan Industrial Manufacturing, Case No. 6:20-CV-00200-ADA, Document 54, Claim Construction Order, Dec. 3, 2020, 3 pages.
Kerr Machine Co., v Vulcan Industrial Holdings, LLC, Vulcan Energy Services, LLC, and Cizion, LLC d/b/a/ Vulcan Industrial Manufacturing, Case No. 6:20-CV-00200-ADA, Docket Entry, Aug. 2, 2020, 1 page.
Kerr Machine Co., v Vulcan Industrial Holdings, LLC, Case No. 6:20-CV-00200, Document 1, Plaintiff's Original Complaint for Patent Infringement and Jury Demand, Mar. 19, 2020, 39 pages.
Adriana del Rocio Barberena-Rovira, et al., v Kuiper Dairy, LLC, et al., Case No. 6:20-CV-00250-ADA-JCM, Document 20, Scheduling Order, Jul. 22, 2020, 4 pages.
Acquanlan Deonshay Harris v. Cenlar, FSB, Case No. 6:20-CV-00271-ADA-JCM, Document 13, Scheduling Order, Aug. 20, 2020, 4 pages.
Senior Living Properties, LLC c. Ironshore Speciality, Insurance Company, Case No. 6:20-CV-00282-ADA-JCM, Document 12, Scheduling Order, Jul. 7, 2020, 4 pages.
Dionne Bracken, Individually and as Next Friend of A.M.B., v Michael D. Ashcraft and Envirovac Waste Transport Systems, Inc., Case No. 6:20-CV-00308-ADA-JCM, Document 17, Scheduling Order, Jul. 28, 2020, 4 pages.
Kendra Coufal v. Roger Lee Thomas and Apple Logistics, Inc., Case No. 6:20-CV-00356-ADA-JCM, Document 12, Scheduling Order, Jul. 28, 2020, 4 pages.
Tipton International, Inc., v. Vetbizcorp, LLC and Samuel Cody, Case No. 6:20-CV-00554-ADA-JCM, Document 8, Scheduling Order, Aug. 20, 2020, 4 pages.
Dynaenergetics GmbH & Co. KG and Dynaenergetics US, Inc., v. Hunting Titan, Ltd.; Hunting Titan, Inc.; and Hunting Energy Services, Inc., Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
Densys Ltd., v. 3Shape Trios A/S and 3Shape A/S, Case No. WA: 19-CV-00680-ADA, Document 27, Scheduling Order, Apr. 8, 2020, 4 pages.
Kerr Machine Co. vs. Vulcan Industrial Holdings, LLC, Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold", filed Apr. 27, 2021.
Karolczuk et al., "Application of the Gaussian Process for Fatigue Life Prediction Under Multiaxial Loading", Mechanical Systems and Signal Processing 167 (2022), Nov. 14, 2021.
Carraro et al. "A Damage Based Model for Crack Initiation in Unidirectional Composites Under Multiaxial Cyclic Loading", Composite Science and Technology 99 (2014), 154-163, May 16, 2014.
Albinmousa et al., "Cyclic Axial and Cyclic Torsional Behaviour of Extruded AZ31B Magnesium Alloy", International Journal of Fatigue 33 (2011), 1403-1416, 2011.
Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.
Guan et al., "Model Selection, Updating, and Averaging for Probabilistic Fatigue Damage Prognosis", Journal of Structural Safety, Mar. 11, 2011.
Frick et al., "Orientation-Independent Pseudoelasticity in Small-Scale Niti Compression Pillars", Scripta Materialia 59(12), 7-10, 2008.
Naghipour et al., "Fatigue Analysis of Notched Laminates: a Time-Efficient Macro-Mechanical Approach", Ohio Aerospace Institute, Cleveland, 2016.
International Search Report and Written Opinion for international application No. PCT/US2023/066143, mailed Aug. 28, 2023.
International Search Report and Written Opinion for international application No. PCT/US2023/073458, mailed Feb. 1, 2024.
Vulcan, High-Impact Replacement Parts, Fortified Valves and Seats, found at: https://www.vulcanindustrial.com/energy-products/replacement-parts, 2021.
International Search Report and Written Opinion for international application No. PCT/US2025/059804, mailed Mar. 11, 2026.
Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
KerrPumps, "Super Stainless Steel Better Than The Best," http://kerrpumps.com/superstainless?gclid=EAIaIQobChMIg47o482q6wIVilTlCh2XPA-qEAAYASAAEgKrxPD_BWE, 2013, last accessed: Aug. 21, 2020, 6 pages.
KerrPumps, "Frac One Pumps—Fluid End—Fracing," http://kerrpumps.com/fracone, 2013, last accessed: Aug. 21, 2020, 3 pages.
KerrPumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.

(56) References Cited

OTHER PUBLICATIONS

COVERT Manufacturing, Inc, "Fluid End Block: Covert Manufacturing", (site visited Jul. 30, 2021), covertmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: < https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.
"QIH-1000 HP Quintuplex," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages.
Https://www.diwmsi.com/pumping/qi-1000/, 2000.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends For Well Stimulation Pumps," 2015, 2 pages.
Claim Chart for U.S. Pat. No. 6,544,012, 23 pages, Sep. 11, 2020.
Claim Chart for U.S. Pat. No. 7,186,097, 22 pages, Sep. 11, 2020.
Claim Chart for U.S. Pat. No. 7,845,413, 8 p. Sep. 11, 2020.
Claim Chart for U.S. Pat. No. 9,534,472, 8 pages Sep. 11, 2020.
Claim Chart for U.S. Pat. Pub. No. 2013/0319220, 17 pages, Sep. 11, 2020.
Claim Chart for U.S. Pat. Pub. No. 2014/0348677, 10 pages, Sep. 11, 2020.
Claim Chart for U.S. Pat. Pub. No. 2015/0132157, 23 pages, Sep. 11, 2020.
Claim Chart for "GD-3000," 9 pages, Sep. 11, 2020.
Claim Chart for "NOV-267Q," 14 pages, Sep. 11, 2020.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "sleeve," "therethrough," "through," "tube," and "tubular," 8 pages, 2017.
Collins English Dictionary, "space," https://www.collinsdictionary.com/us/dictionary/english/space, 2021, 13 pages.
Collins English Dictionary, "stairstep," https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in Kerr Machine v Vulcan Industrial Holdings, 1 page.
U.S. Pat. No. 10,288,178, 353 pages, Sep. 29, 2016.
U.S. Pat. No. 10,519,950, 142 pages, Aug. 24, 2017.
U.S. Pat. No. 10,591,070, 168 pages, Sep. 18, 2019.
U.S. Appl. No. 16/722,139, 104 pages, Dec. 20, 2019.
U.S. Appl. No. 13/773,271, 250 pages, Feb. 21, 2013.
U.S. Appl. No. 15/719,124, 183 pages, Sep. 28, 2017.
U.S. Appl. No. 16/814,267, 194 pages, Mar. 10, 2020.
U.S. Appl. No. 17/120,121, 110 pages, Dec. 12, 2020.
U.S. Appl. No. 62/234,483, 45 pages, Sep. 29, 2015.
U.S. Appl. No. 62/315,343, 41 pages, Mar. 30, 2016.
U.S. Appl. No. 62/318,542, 44 pages, Apr. 5, 2016.
U.S. Appl. No. 62/346,915, 41 pages, Jun. 7, 2016.
U.S. Appl. No. 62/379,462, 24 pages, Aug. 25, 2016.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 2 pages, 2021.
Cutting Tool Engineering, "Groove milling," Aug. 1, 2012, https://www.ctemag.cojm/news/articles/groove-milling, accessed May 13, 2020, 11 pages.
VargusUSA, "Groovex Innovative Grooving Solutions—Groove Milling," Dec. 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages, 2008.
Kerr Pumps, Kerr KD-1250B/KD-1250BCB Plunger Pump Service Manual, 38 pages, 2017.
Kerr Pumps, Kerr KJ-2250B and KJ-2250BCB Plunger Pump Service Manual, 38 pages, 2008.
Kerr Pumps, Kerr KM-3250B / KM-3250BCB Plunger Pump Service Manual, 35 pages, 2008.
Kerr Pumps, Kerr KP-3300B / KP-3300BCB Plunger Pump Service Manual, 41 pages, 2008.
Kerr Pumps, Kerr KT-3350B/BCB KT-3400BCB Plunger Pump Service Manual, 46 pages, 2008.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, Kerr Machine Co. v. Vulcan Industrial Holdings, LLC Docket Entries, https://law.lexmachina.com/cases/2004206451#docket-entries, 6 pages, 2020.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page, 2016.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.

(56) References Cited

OTHER PUBLICATIONS

Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages, 2013.
Gardner Denver Pumps, Redline Series Brochure, 3 pages, 2021.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
DiaCom Corporation, "Diaphragm Design Guidebook", 28 pages, 2018.

* cited by examiner

DUAL RING STUFFING BOX

CROSS REFERENCE TO RELATED APPLICATIONS

This application is a continuation of U.S. Non-Provisional application Ser. No. 18/775,355, filed Jul. 17, 2024, titled "DUAL RING STUFFING BOX," which is a continuation of U.S. Non-Provisional application Ser. No. 17/864,873, filed Jul. 14, 2022, titled "DUAL RING STUFFING BOX," now U.S. Pat. No. 12,055,221, issued Aug. 6, 2024, which is a continuation-in-part of U.S. patent application Ser. No. 17/213,854, filed Mar. 26, 2021, titled "DUAL RING STUFFING BOX," now U.S. Pat. No. 11,391,374, issued Jul. 19, 2022, which claims the benefit of U.S. Provisional Ser. No. 63/137,501 , filed Jan. 14, 2021, titled "DUAL RING STUFFING BOX. ," and is a continuation-in-part and claims the benefit of U.S. patent application Ser. No. 29/769,314, filed Feb. 4, 2021, titled "FLUID END FOR A PUMPING SYSTEM," now U.S. Pat. No. D 933104, issued Oct. 12, 2021, and is a continuation-in-part and claims the benefit of U.S. patent application Ser. No. 29/769,318, filed on Feb. 4, 2021, titled "FLUID END FOR A PUMPING SYSTEM," now U.S. Pat. No. D 933105, issued Oct. 12, 2021, the disclosures of which are incorporated herein by reference in their entireties for all purposes.

TECHNICAL FIELD

Embodiments of the subject matter disclosed herein generally relate to pump systems, and in particular to sealing assemblies for pumping systems.

BACKGROUND

Pumping systems may be used in a variety of applications, such as industrial applications where pumping systems are used to elevate a working fluid pressure. One such application is hydraulic fracturing systems, where high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A plunger reciprocates within a bore to add energy to the fluid. A stuffing box may be positioned around the plunger to block fluid leaks.

SUMMARY

Applicant recognized the problems noted above herein and conceived and developed embodiments of systems and methods, according to the present disclosure, for stuffing boxes.

In an embodiment, a system includes a pressure ring positioned to abut a fluid end face, the pressure ring having a pressure ring bore with a diameter larger than a fluid end bore diameter. The system also includes an adjacent ring coupled to a fluid end, the pressure ring positioned between the adjacent ring and the fluid end face. The system further includes a face seal positioned at an interface of the pressure ring and the fluid end face, the face seal containing pressurized fluid associated with the fluid end. The system also includes packing material positioned within at least a portion of the pressure ring bore.

In an embodiment, a system includes a fluid end, the fluid end having a recessed area extending to a fluid end face. The system further includes a pressure ring positioned within the recessed area against the fluid face to compress the face seal, the pressure ring having a pressure ring bore positioned co-axially with a fluid end bore, and the pressure ring bore has a diameter greater than the fluid end bore. The system also includes an adjacent ring positioned against the pressure ring and coupled to the fluid end. The system includes a face seal arranged between the pressure ring and the fluid end. The system further includes packing material positioned within the pressure ring bore, at least a portion of the packing material being positioned external to the fluid end bore.

In an embodiment, a method includes inserting a face seal into a face groove. The method also includes positioning a pressure ring, within a recessed portion, to compress the face seal. The method further includes positioning an adjacent ring against the pressure ring. The method also includes securing the adjacent ring to a fluid face, wherein the pressure ring is positioned between the adjacent ring and the fluid end. The method includes installing, within a pressure ring bore, packing material.

In an embodiment, a system includes a fluid end having a fluid end face and a recess extending toward a base. The system also includes a pressure ring extending from the fluid end face, the pressure ring having a pressure ring bore diameter larger than a fluid end bore diameter. The system further includes an adjacent ring coupled to the fluid end, the pressure ring positioned between the adjacent ring and the base, wherein at least one fastener extends through an aperture of the adjacent ring to couple the adjacent ring to the fluid end. The system includes packing material positioned within at least a portion of the pressure ring bore, the packing material positioned such that axial movement toward the fluid end is blocked by the base.

In an embodiment, a system includes a fluid end, the fluid end having a recessed area. The system also includes a pressure ring extending from the recessed area, the pressure ring having a pressure ring bore positioned co-axially with a fluid end bore, and the pressure ring bore having a diameter greater than the fluid end bore. The system further includes an adjacent ring positioned against the pressure ring and coupled to the fluid end. The system includes packing material positioned within the pressure ring bore, at least a portion of the packing material being positioned external to the fluid end bore. The system also includes an injection port extending through the adjacent ring, the injection port arranged in a low pressure region, axially away from a seal between the pressure ring and the adjacent ring.

In an embodiment, a method includes providing a fluid end including a recessed area extending into a fluid end face and a pressure ring extending axially out of the recessed area. The method also includes positioning an adjacent ring against the pressure ring. The method further includes securing the adjacent ring to the fluid end. The method includes installing, within a pressure ring bore, packing material.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
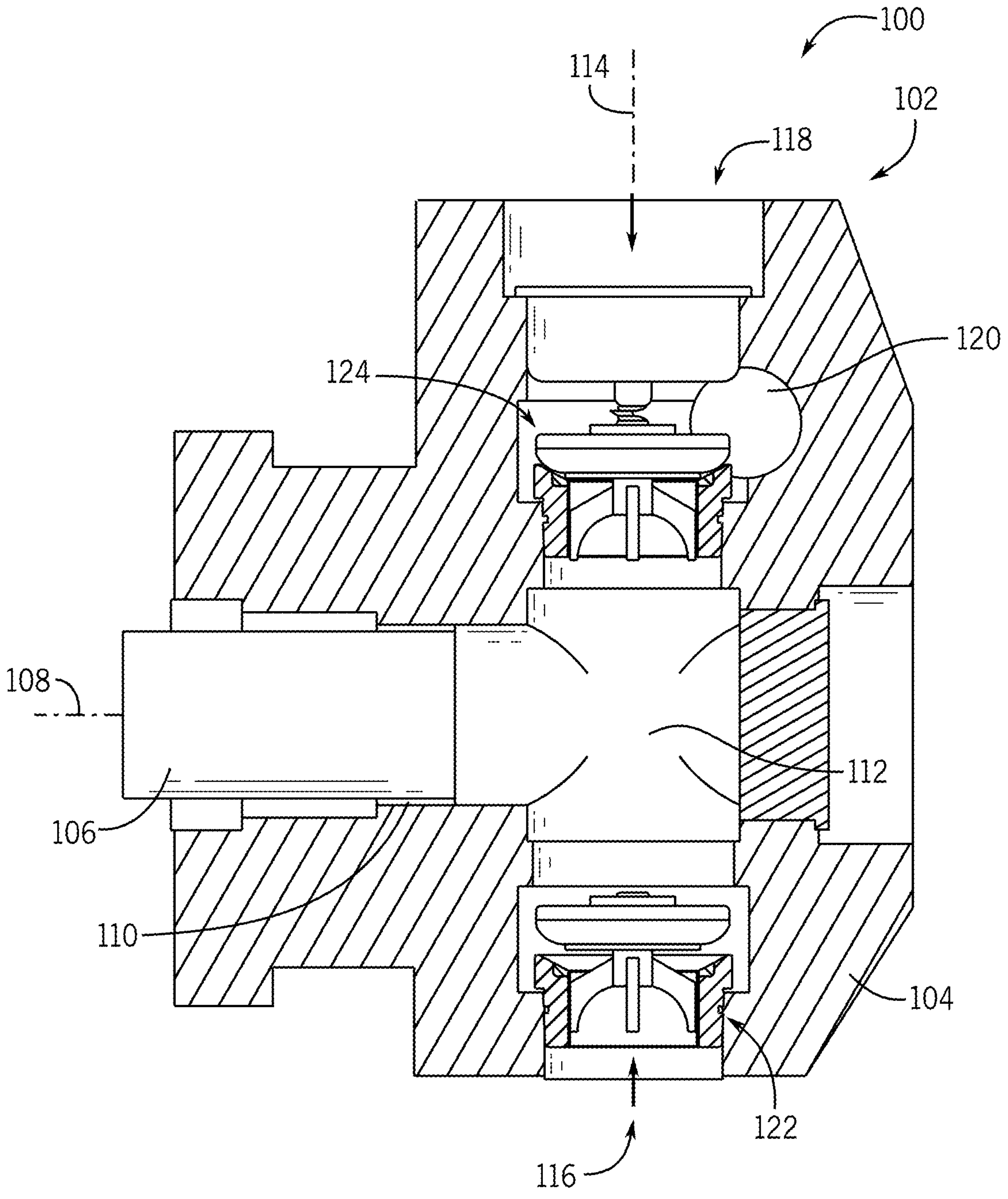
FIG. 1 is a schematic cross-sectional view of a prior art pump assembly.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Moreover, like numbers for may be used for like components, but such disclosure is for convenience purposes and is not intended to limit the scope of the present disclosure.

Traditional fluid ends feature an integrated stuffing box which requires a larger forging and more material to be removed. This is an expensive process. An alternative is a removable and replaceable stuffing box where the pressure vessel components are attached to the fluid end. This has been achieved previously by stuffing boxes which were threaded into the fluid end via large power threads such as ACME or Buttress profiles. These threaded stuffing boxes were heavy and difficult to install and then prone to failures of the threaded interfaces.

Embodiments of the present disclosure address and overcome problems faced with traditional stuffing boxes utilized with pumping units, such as fluid ends for fracturing pumps, and may be further incorporated in various systems with reciprocating components. In at least one embodiment, systems and methods of the present disclosure include a set of rings flanged into place such that a pressure containing ring is made from a wear resistant stainless steel, or any other type of wear resistant material, and an adjacent ring is made from a less expensive alloy steel, or any type of compatible material, as well as similar wear resistant materials. The two rings are joined together and preloaded by a series of fasteners (e.g., studs, nuts, bolts, cap screws, etc.). In various embodiments, the pressure containing ring houses a face seal or the fluid cylinder may house the face seal. Furthermore, the seal could be partially set into both. In one or more embodiments, a sealing element is arranged between the two rings, which includes a sealing component, such as an o-ring or other seal, which may be retained in the pressure ring, the adjacent ring, or both. Various embodiments also include a cross drilled weep hole where the intersecting holes may or may not be drilled entirely through the pressure ring. For example, in some iterations they may be intersecting blind holes. The pressure ring extends past the last pressure ring of a packing set such that anything closer to the exterior of the fluid end (e.g., radially outward from a pressure chamber) is not exposed to pressurized fracking fluid.

In one or more embodiments, systems and methods use studs and nuts that pass through dual rings of the stuffing box. It should be appreciated that these fasteners are provided by way of example only and are not intended to limit the scope of the present disclosure, as other fasteners, such as bolts and the like, may be used. Moreover, a threaded or otherwise locking interface between the rings may be utilized, such as a bayonet connection, J-hook, or the like. The fluid end may be machined such that an outside diameter of the pressure ring serves as a fine alignment feature during installation. The pressure ring may also be arranged such that it is also the only portion of the stuffing box exposed to the high pressure fracking fluid. Accordingly, in various embodiments, the pressure ring may be formed from a high grade stainless steel, among other wear resistant and/or specialized materials, while the adjacent ring would be made from alloy steel, among other types of materials, thereby reducing costs associated with implementation of the various embodiments disclosed herein. In at least one embodiment, the pressure ring may be integrally formed or be continuous with the materials associated with the fluid end.

Embodiments of the present disclosure may incorporate a sealing element within the fluid end body and/or within the pressure ring. This configuration may further include a single outer diameter. As a result, a seal designed to seal against the pressurized fluid may be retained by the pressure ring and/or the adjacent ring. Furthermore, embodiments may include a grease insertion point associated with the adjacent ring and also one or more threads to receive a packing nut. Moreover, a recessed shelf may be incorporated such that radial holes in the packing nut are clearly exposed above the heads of the fasteners (e.g., studs and nuts, bolts, cap screws, etc.). In certain embodiments, the packing set rests on the fluid end block surface. In others, the pressure containing ring features a shelf where a spacer ring may be installed and retained such that the packing assembly sits on the spacer ring.

In one or more embodiments, a section of removed material across a backside of the fluid end, such that the stuffing box does not sit within any bore but sits on the back face of the fluid end, is incorporated. For example, a recess or groove may be formed within the fluid end to receive the pressure ring. In one or more embodiments, the recess or groove may extend substantially across the entire fluid end. In certain embodiments, the recess or groove may be particularly located at individual locations for individual stuffing boxes. Furthermore, the pressure ring may extend from the fluid end face such that the groove or recess extends radially into the body of the fluid end. As will be described below, in various embodiments, the recess or groove may be squared or slanted. Furthermore, a depth of the recess or groove may be particularly selected based on one or more operating conditions for the fluid end.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid end 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet chamber 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger rod 106, and is driven out of an outlet passage 120, for example on a down stroke of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed position, while the spring force of the valve assembly 124 is overcome, thereby enabling the fluid to exit via the outlet passage 120.

Piston pumps or plunger pumps, such as the pump assembly 100 shown in FIG. 1, are positive displacement pumps and are commonly used in environments where the fluids that are being handled pose problems such as high temperatures, viscous media, or solids-charged liquids. One such example is in oil and gas operations, particularly fracturing operations, where solids laden fluids may be used. Examples of these fluids include drilling fluids, muds, cement slurries, fracturing slurries, acids and the like, which frequently must be pumped under high pressure into the well. These abrasive fluids provide challenges for the various sealing interfaces of the pumps. One such interface includes along the plunger 106. As will be described, various systems and methods of the present disclosure may include a stuffing box configuration that includes one or more rings to secure a packing material along the bore 110 to block leakage of fluid out of the fluid end 102. In various embodiments, the one or more rings may be arranged external to the bore 110, such as against a face of the fluid end 102.

Figure 2:
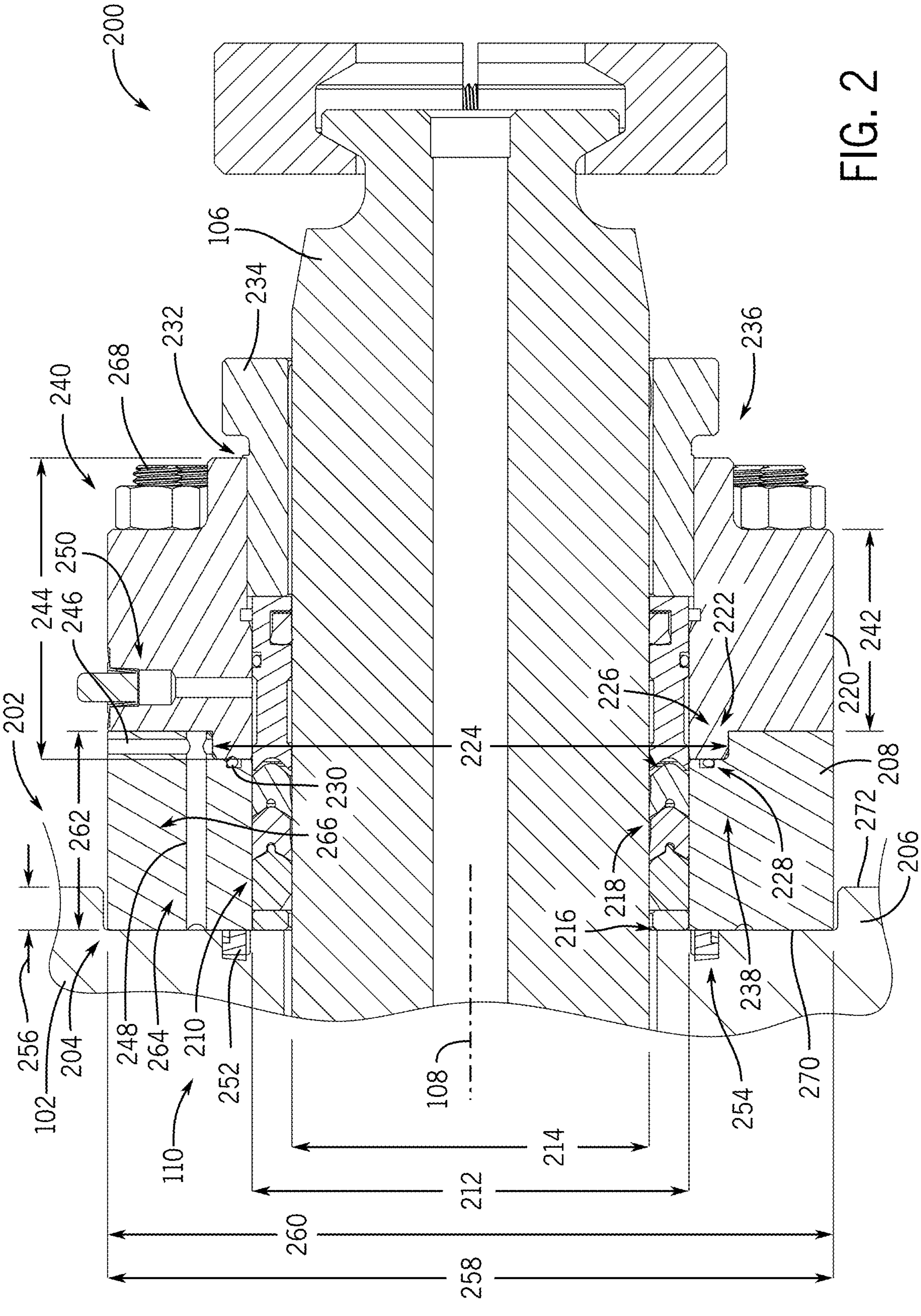
FIG. 2 is a cross-sectional view of an embodiment of a stuffing box assembly, in accordance with embodiments of the present disclosure.

FIG. 2 is a cross-sectional side view of an embodiment of a stuffing box assembly 200 that may be utilized with one or more reciprocating components, such as the plunger 106 illustrated in FIG. 1. As noted, like numerals may be used throughout to represent like features, but such numbering for convenience and is not intended to limit the scope of the present disclosure. In this example, the stuffing box assembly 200 is positioned on a back side 202 of the fluid end 102. It should be appreciated that "back side" is a relative term and is not intended to limit one or more orientations of the fluid end 102. The plunger 106 extends within the bore 110 along the plunger axis 108, as indicated above, and may be driven to reciprocate along the plunger axis 108 to add energy to the pressure chamber 112 (FIG. 1).

The illustrated stuffing box assembly 200 is positioned against a recessed area 204 (e.g., grooved area, offset area, depressed area, etc.) formed in the back side 202. In at least one embodiment, at least a portion of the stuffing box assembly 200 may extend at least partially into a recessed portion or cut out section formed with respect to the recessed area 204. In other words, the recessed area 204 represents a removal of material from the fluid end 102 and/or a forming process that provides an area with a reduced lateral position (with respect to the orientation of FIG. 2) compared to an adjacent area. In this example, the recessed area 204 includes a wall 206 forming the recessed area 204, which may be a continuous, annular wall 206. It should be appreciated that reference to a single wall is not intended to be limiting, as there may be various regions formed that have different radial extents or the like to prevent rotation and, moreover, the wall 206 may not be continuous in all embodiments. As an example, in one or more embodiments, the wall 206 extends for a length of the fluid end 102. However, in other examples, the wall 206 may extend for a particular extent. In one or more embodiments, the recessed portion and/or groove 206 may be omitted and the stuffing box assembly 200 may be pressed directly against the back side 202, for example along a planar region of the back side 202. By way of example only, a number of different grooves 204 may be formed along the back side 202, for example at each bore 110. In this example, the recessed area 204 receives a pressure ring 208 (e.g., a first ring, a pressure-containing ring) that abuts to the recessed area 204 such that at least a portion of the pressure ring 208 is overlapped by at least a portion of the wall 206. That is, the pressure ring 208 abuts against the recessed area 204 and, in various embodiments, at least a portion of the pressure ring 208 extends axially out of recessed portion associated with the recessed area 204 (e.g., axially along the plunger 108 in a direction away from the back side 202). It should be appreciated that a distance of axial extension may be particularly selected based on design conditions, and moreover, that a recessed area depth may also be particularly selected based on design conditions. As noted, in various embodiments, the recessed area 204 may be omitted such that the stuffing box assembly 200 is flush against the back side 202. The illustrated pressure ring 208 further includes a pressure ring bore 210 that is axially aligned with the bore 110 to enable reciprocation of the plunger 106 along the plunger axis 108. However, as will be described below, various dimensions of the pressure ring bore 210 may differ from the bore 110 to facilitate installation of various materials, such as one or more packing assemblies or components thereof.

In the example of FIG. 2, an inner diameter 212 of the pressure ring 208 is greater than an inner diameter 214 of the bore 110, thereby providing a shelf 216 for packing materials 218 (e.g., stuffing material, a packing assembly). The packing materials 218 include various components, such as seals, brass, and the like, which may be utilized to block fluid flow upward and along the plunger rod 106. The packing materials 218 may be particularly selected based, at least in part, on one or more operating conditions of the fluid end 102, as well as various dimensions of the shelf 216, plunger 106, and pressure ring 208, among other components. Accordingly, the illustrated configuration is for example purposes only, and it should be appreciated that more or less material may be included in embodiment where additional or less space is provided for the packing materials 218. It should further be appreciated that, in various embodiments, the shelf 216 may be formed, at least in part, by the pressure ring 208. For example, the inner diameter 212 may not be constant across the pressure ring 208 and may include the shelf 216 at a variable diameter portion. That is, the pressure ring 208 may include a first inner diameter at the inner diameter 212 and a second inner diameter, less than the first inner diameter 212, that forms the shelf. However, in various other embodiments, the first diameter 212 (e.g., the portion that engages the packing materials 218) may be smaller than a second inner diameter. Furthermore, one or more components, such as a spacer ring, may also be incorporated to serve as the shelf 216.

In various embodiments, an adjacent ring 220 (e.g., outer ring, second ring, non-pressure containing ring, etc.) is positioned to abut the pressure ring 208. In this example, the adjacent ring 220 is at least partially overlapped by the pressure ring 208. That is, an overlapped region 222 includes a second pressure ring inner diameter 224, larger than the inner diameter 212, that receives a lip 226 of the adjacent ring 220. As a result, a portion of the pressure ring 208 is illustrated as radially overlapping a portion of the adjacent ring 220. In various embodiments, the lip 226 is proximate a seal groove 228 formed in the pressure ring 208 that receives a seal 230. It should be appreciated that the seal groove 228 and the position of the seal 230 may also be within the adjacent ring 220 in other embodiments or may be partially within the pressure ring 208 and partially within the adjacent ring 220.

In various embodiments, the overlapped region 222 is configured to be axially farther from the back side 202 (e.g., toward the right relative to the orientation of FIG. 2) with respect to one or more packing materials 218 such that the adjacent ring 220 is not exposed to pressurized fluid from the fluid end 102. It should be appreciated that the overlapped region 222 may also be positioned along any portion of the packing materials 218 and that the configuration in FIG. 2 is for illustrative purposes only.

The adjacent ring 220 further includes a coupling region 232, which includes threads in this embodiment, to receive a retainer 234 (e.g., packing nut), which may include mating threads or the like. The retainer 234 may be utilized to maintain a position of the packing materials 218. It should be appreciated that the retainer 234 may be coupled to the adjacent ring 220 and/or to other components in a variety of ways, such as external fittings, clamps, and the like. As shown, the coupling region 232 is arranged at a first end 236 of the adjacent ring 220, opposite a second end 238. The first end 236 is farther from the back side 202 than the second end 238. The first end 236 further includes a stepped portion 240 such that a stepped portion length 242 is less than an adjacent ring length 244. The stepped portion 240 provides a region to receive one or more fasteners to couple the adjacent ring 220 to the pressure ring 208. For example, fasteners may extend through aligned apertures to join the components together. As illustrated, the stepped portion 240 positions the fasteners out of alignment with the retainer 234 to provide improved access to both components. In other words, the fasteners are arranged axially closer to the back side 202 than a top of the retainer 234 to facilitate access to each of the components. It should be appreciated that the fasteners illustrated are for illustrative purposes only and that other coupling devices may be utilized to join the pressure ring 208 to the adjacent ring 220.

Returning to the pressure ring 208, a weep hole 246 is illustrated extending radially through the pressure ring 208. In this example, the weep hole 246 intersects an axial hole 248 extending axially through the pressure ring 208. It should be appreciated that one or more of the weep hole 246 or the axial hole 248 may or may not extend entirely through the pressure ring 208. For example, one or more of the holes 246, 248 may extend to a particular region to form a blind. In this example, the weep hole 246 is positioned proximate the overlapping region 222, but various other locations may also include weep holes 246. That is, the weep holes 246 may be arranged at different locations along the axial length of the pressure ring 208. Furthermore, one or more weep holes 246 may be drilled circumferentially about the pressure ring 208 that intersect with one or more axial holes 248 or that do not intersect axial holes 248. By way of example, the pressure ring 208 may include multiple weep holes 246 arranged at different circumferential positions of the pressure ring 208 and one or more of these weep holes 246 may or may not intersect one or more additional axial holes 248.

The illustrated adjacent ring 220 also includes an injection port 250, which may be utilized to direct grease toward the packing material 218. It should be appreciated that the injection port may be arranged at any reasonable location to enable injection of various substances toward the bore 110. In various embodiments, it may be preferential to position the injection port 250 downstream of the seal 230 such that the injection port 250 is not subject to the pressure of the fracturing fluid.

In operation, the pressure ring 208 and the adjacent ring 220 are coupled to the fluid end 102, for example via fasteners. As illustrated, the back side 202 may include a face seal 252 between the back side 202 and the pressure ring 208. In this example, a face groove 254 is formed in the back side 202 to receive the face seal 252. It should be appreciated that, in other embodiments, the face seal 252 may be associated with the pressure ring 208, rather than the back side 202. For example, the face groove 254 may be formed in the pressure ring 208. Additionally, in at least one embodiment, the face groove 254 may be formed partially within the back side 202 and partially within the pressure ring 208. In one or more embodiments, the face seal 252 may seal against pressurized fluid within the fluid end 102. As shown, embodiments provide the packing materials 218 of the associated stuffing box assembly 200 abutting on the fluid end 102, rather than a sleeve being within the bore, as noted above.

Various embodiments of the present disclosure are directed toward a substantially external stuffing box assembly 200 that is not positioned within the bore 110, however, it should be appreciated that various alternative configurations may include the stuff box assembly 200 or portions thereof that extend into the bore 110. In this example, the groove 204 is formed within the back side 202 such that the groove 204 extends a groove depth 256 into the back side 202. The groove depth 256, as noted above, may be particularly selected based on operating conditions, tooling conditions, or the like. The illustrated groove 204 is formed with a groove height 258 that is configured to receive the pressure ring 208 with a secure fit such that the groove height 258 may be substantially equal to a pressure ring outer diameter 260. In embodiments, the configuration of the dimensions may facilitate alignment and installation of the components, where a misalignment may be visually established by resistance of fitting the pressure ring 208 into the groove 204. Other embodiments may include configurations where the groove height 258 is greater than the outer diameter 260.

As described above, various embodiments position the stuffing box assembly 200 external to the bore 110. In the illustrated embodiment, the pressure ring 208 extends axially away from the back side 202 such that at least a portion of a pressure ring thickness 262 is external the groove 204. That is, the pressure ring thickness 262 may include an internal portion 264 that is within the groove 204 and an external portion 266 that is outside of the groove 204. In various embodiments, the internal portion 264 is less than the external portion 266, but it should be appreciated that a variety of configurations may be utilized within the scope of the present disclosure (e.g., internal greater than external, portions equal, etc.). Accordingly, the pressure ring 208 may be fixed to the fluid end 102 via fasteners 268 that extend through the pressure ring 208 and the adjacent ring 220. In one or more embodiments, the fasteners 268 include threaded fasteners, such as bolts, but it should be appreciated that additional fasteners may also be used within the scope of the present disclosure, such as clamps, radial fasteners (as opposed to the illustrated axial fasteners), integrated bayonet fittings, and the like.

In various embodiments, the back side 202 may also be referred to as having a fluid end face 270, which may correspond to the surface within the groove 204. As a result, in the illustrated example, the pressure ring 208 would abut or otherwise be positioned against the fluid end face 270. Moreover, an outer face 272 may be used to describe the region around the groove 204, where the fluid end face 270 is axially closer to the internal components of the fluid end 102 than the outer face 272.

Figure 3:
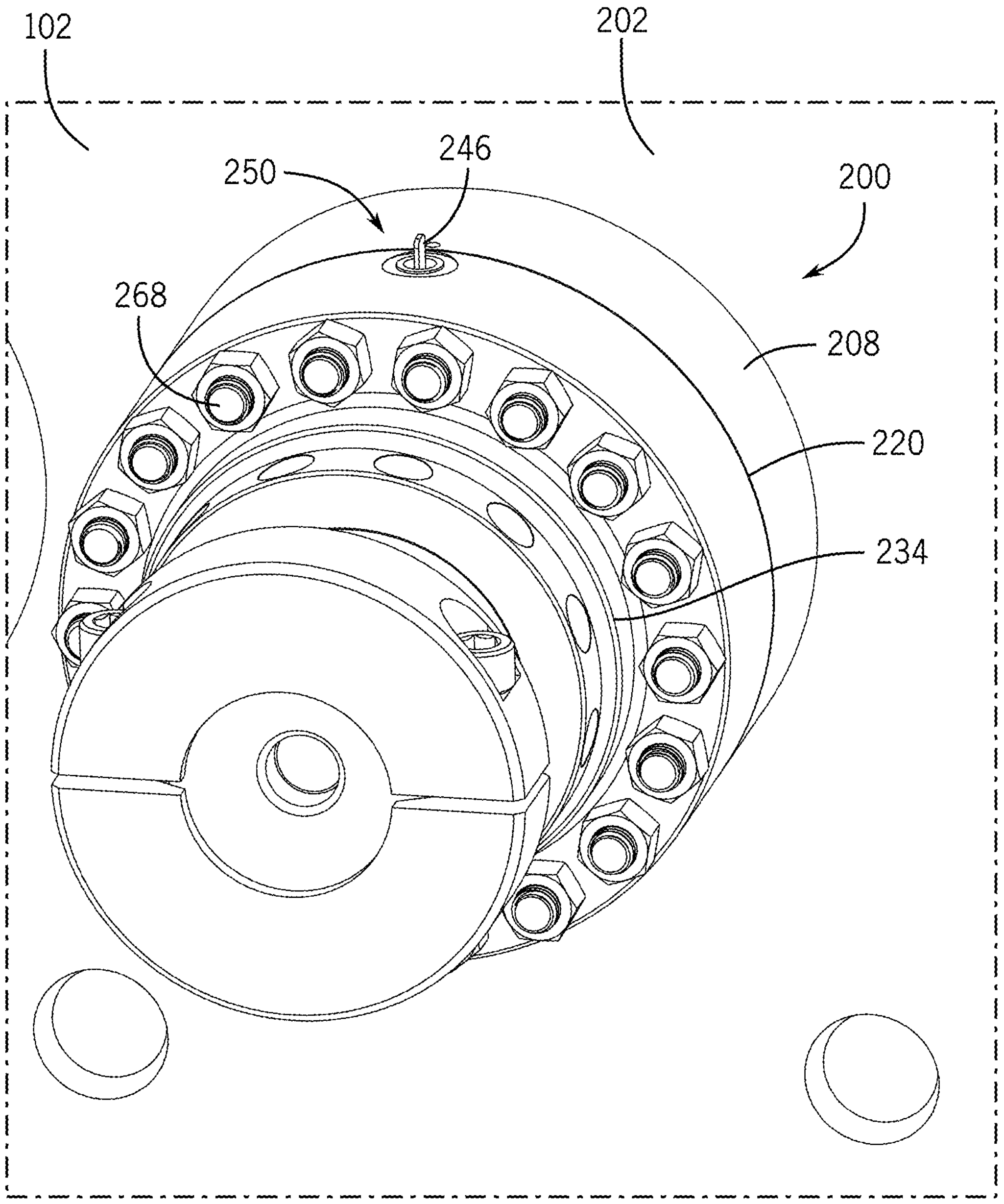
FIG. 3 is an isometric view of an embodiment of a stuffing box assembly, in accordance with embodiments of the present disclosure.

FIG. 3 is an isometric view of an embodiment of the stuffing box assembly 200. In this example, the pressure ring 208 and the adjacent ring 220 are both illustrated extending axially away from the back side 202. Further illustrated are the fasteners 268 that extend through the pressure ring 208 and the adjacent ring 220 to couple the stuffing box assembly 200 to the back side 202. For example, the fasteners 268 may extend into mating apertures formed in the fluid end 102. Moreover, as noted above, the retainer 234 is arranged within the adjacent ring 220, for example coupled via threads. The injection port 250 is arranged positioned proximate the weep whole 246. As noted above, while a single port 250 and single weep hole 246 are illustrated in this example, more may be included, for example at different circumferential positions.

Figure 4:
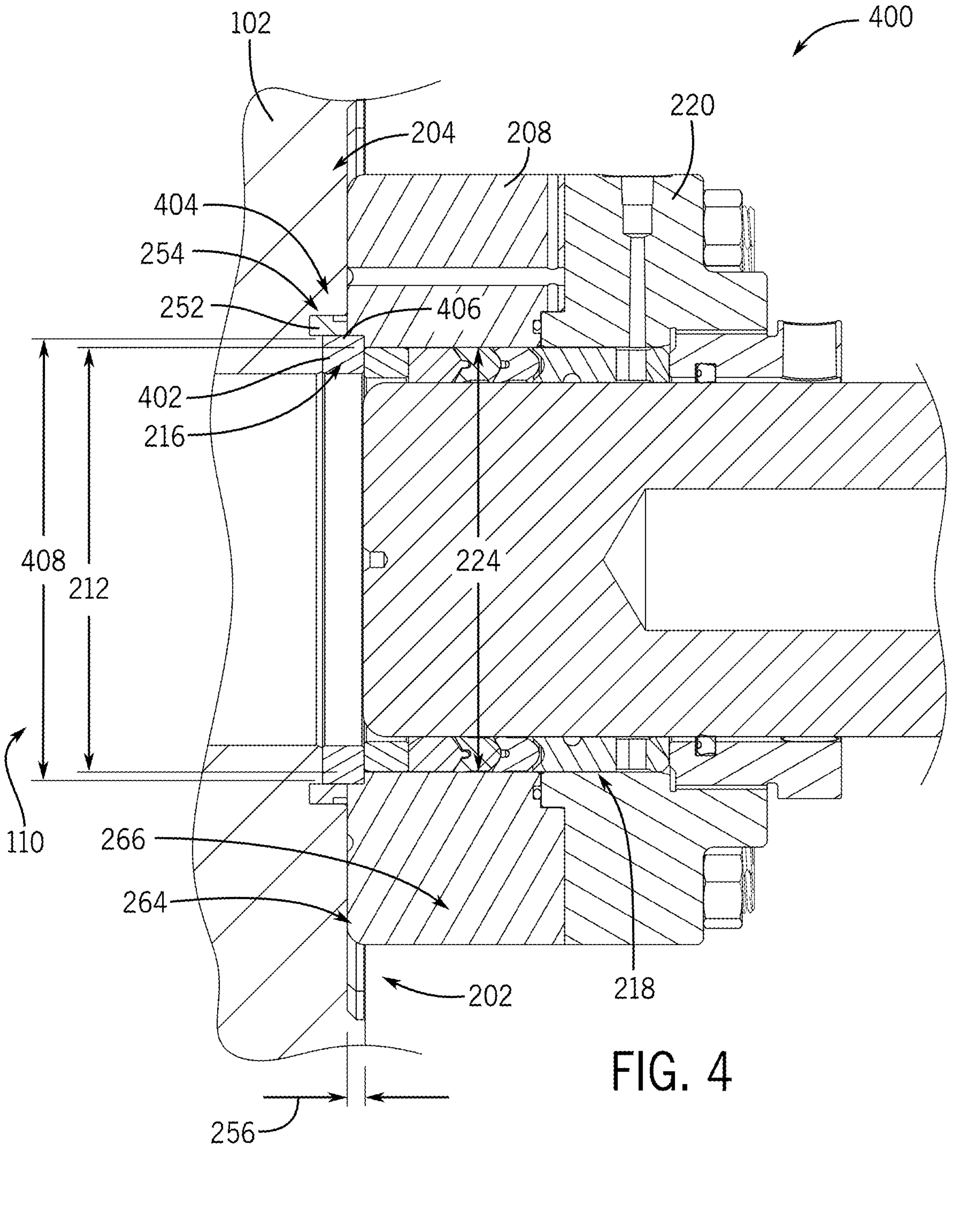
FIG. 4 is a cross-sectional view of an embodiment of a stuffing box assembly, in accordance with embodiments of the present disclosure.

FIG. 4 is a cross-sectional view of an embodiment of a stuffing box assembly 400 that may share one or more features with the stuffing box assembly 200 of FIG. 2. For simplicity and clarity, certain portions will not be repeated herein. In this example, the pressure ring 208 is arranged within the recessed area 204 and abuts the back side 202 of the fluid end 102. As described above, the internal portion 264 extends into the groove depth 256. In this example, the internal portion 264 is less than the external portion 266. In at least one embodiment, the pressure ring 208 compresses the face seal 252, which in this example is shown associated with the back side 202 within the face groove 254, but in other examples may be associated with the pressure ring 208. Furthermore, as described above, the adjacent ring 220 is coupled to the pressure ring 208.

In this example, a spacer ring 402 is positioned along a transition 404 at the bore 110. As shown, the spacer ring 402 is arranged proximate the face seal 252 and extends axially away from the back side 202 such that the spacer ring 402 at least partially overlaps the face groove 254. It should be appreciated that, in various embodiments, a conjoined groove or set of grooves may be utilized to receive the face seal 252 and the spacer ring 402. Moreover, in one or more embodiments, material may separate grooves for the face seal 242 and the spacer ring 402. In various embodiments, the space ring 402 may even form a portion of the bore 110. The spacer ring 402 may be utilized as the shelf 216, as described above, to receive the packing materials 218.

As shown, the pressure ring 208 may include a notch 406 that receives a portion of the spacer ring 402. For example, the notch 406 may represent a groove or an increased diameter portion 408, compared to the inner diameter 212, to receive and support at least a portion of the spacer ring 402. In various embodiments, the pressure ring 208, in combination with one or more other elements, at least partially blocks axial movement of the spacer ring 402 away from the back side 202 (toward the right relative to the orientation of FIG. 4). It should be appreciated that relative dimensions for the spacer ring 402 and/or notch 406 may be particularly selected based on operating conditions. In operation, the illustrated stuffing box assembly 400 enables isolation of the pressurized fluids within the fluid end 102 by supporting one or more components against the back side 202 of the fluid end 102.

As noted above, in this example the pressure ring 208 includes three different internal diameter positions, namely the inner diameter 212, the second inner diameter 224, and the increased diameter portion 408. In this example, the increased inner diameter portion 408 is smaller than the second inner diameter 224, but larger than the inner diameter 212. Accordingly, it should be appreciated that various different stepped portions may be positioned along the pressure ring bore 210 to facilitate positioning and retention of one or more components utilized with the stuffing box assembly 200.

Figure 5:
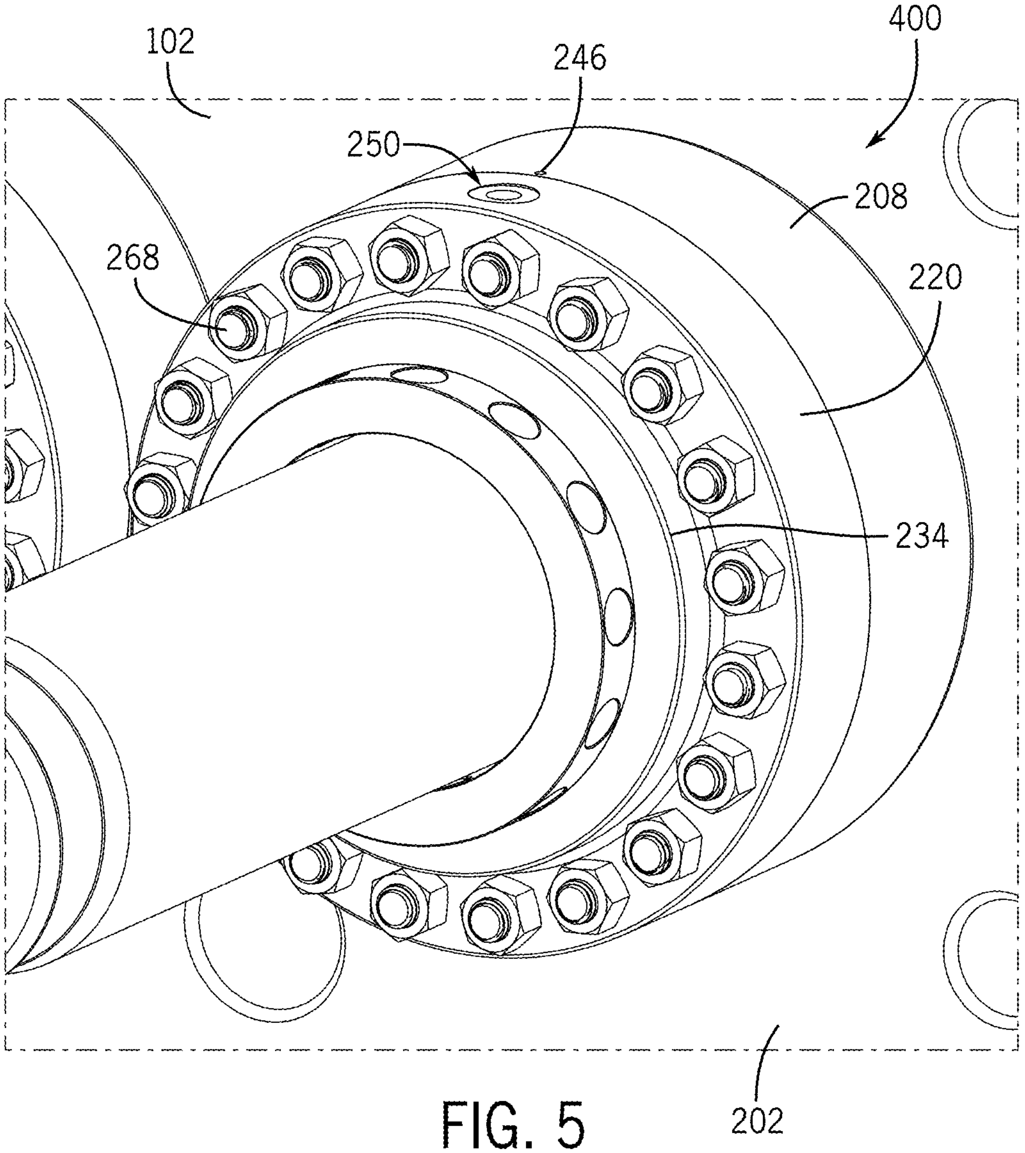
FIG. 5 is an isometric view of an embodiment of a stuffing box assembly, in accordance with embodiments of the present disclosure.

FIG. 5 is an isometric view of an embodiment of the stuffing box assembly 400. In this example, the pressure ring 208 and the adjacent ring 220 are both illustrated extending axially away from the back side 202. Further illustrated are the fasteners 268 extending through the pressure ring 208 and the adjacent ring 220 to couple the stuffing box assembly 400 to the back side 202. For example, the fasteners 268 may extend into mating apertures formed in the fluid end 102. Moreover, as noted above, the retainer 234 is arranged within the adjacent ring 220, for example coupled via threads. The injection port 250 is arranged positioned proximate the weep hole 246. As noted above, while a single port 250 and single weep hole 246 are illustrated in this example, more may be included, for example at different circumferential positions.

Figure 6:
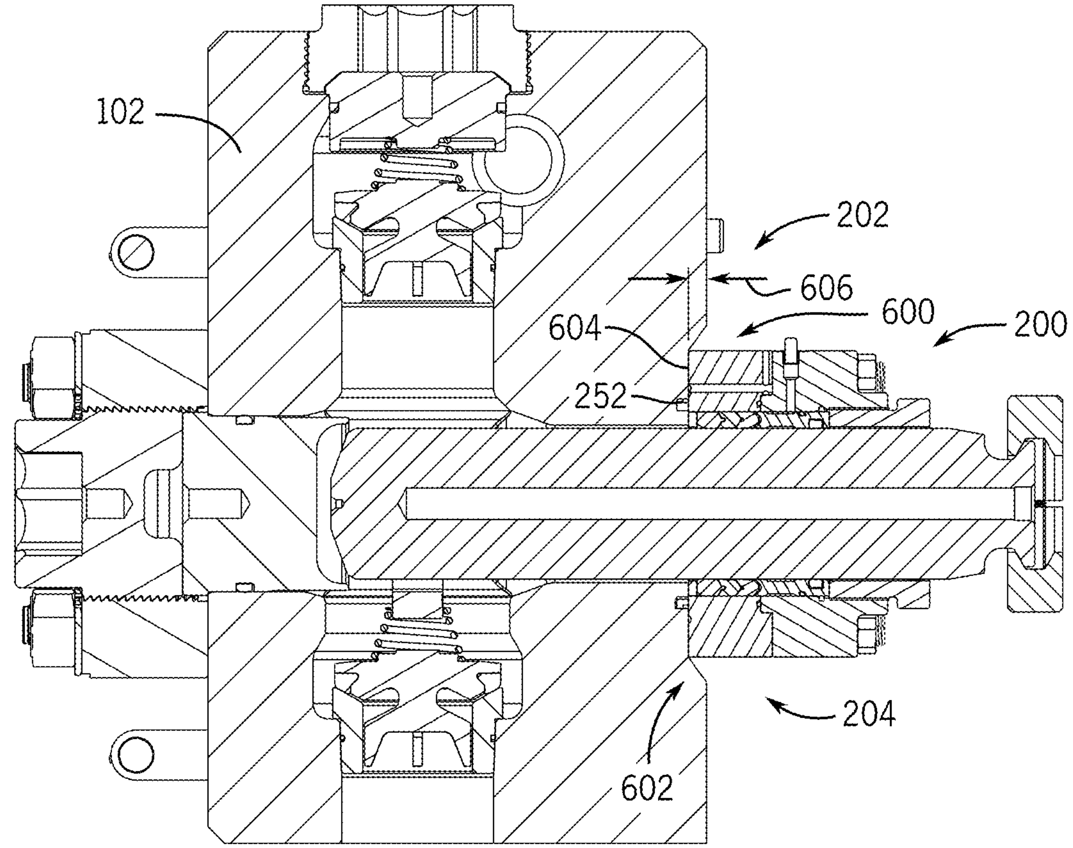
FIG. 6 is a cross-sectional view of an embodiment of a stuffing box assembly, in accordance with embodiments of the present disclosure.

FIG. 6 is a cross-sectional view of an embodiment of the stuffing box assembly 200 coupled to a back side 202 of the fluid end 102. In this example, the recessed area 204 is represented by a cut out region 600, which will be described in more detail below. In this example, the cut out region 600 includes a sloped entry 602 and a mating face 604, which represents at least a portion of the back side 202 of the fluid end 102. As shown, the cut out region 600 includes a depth 606 (similar to the groove depth 256), which may be representative of removed material or the part may be cast or otherwise formed without this material. As a result, inclusion of additional components abutting the back side 202 may not substantially increase an overall size of the fluid end 102. While the illustrated embodiment includes the recessed area 204 as the cut out region 600, it should be appreciated that various embodiments may include an extruded or outwardly extended region as opposed to a cut out region. By way of example, the portions illustrated as the cutout region 600 may extend outwardly and away such from back side 202 as opposed as being recessed. Moreover, as will be described below, additional geometries may also be utilized to form the cut out region 600 and/or any extruded or outwardly extending region.

It should be appreciated that the sloped entry 602 is for illustrative purposes only, along with the substantially symmetrical configuration of the cut out region 600. For example, the sloped entry 602 may be replaced by squared (e.g., approximately 90 degree) walls and/or a curved entry. Furthermore, in various embodiments, the cut out region 600 extends along a length of the fluid end, as illustrated in below. However, in other embodiments, individual cut out regions 600 may be formed from the fluid end. In operation, the stuffing box assembly 200 may couple to the back end 202, within the cut out region 600, to compress the face seal 252, as described above.

Figure 7:
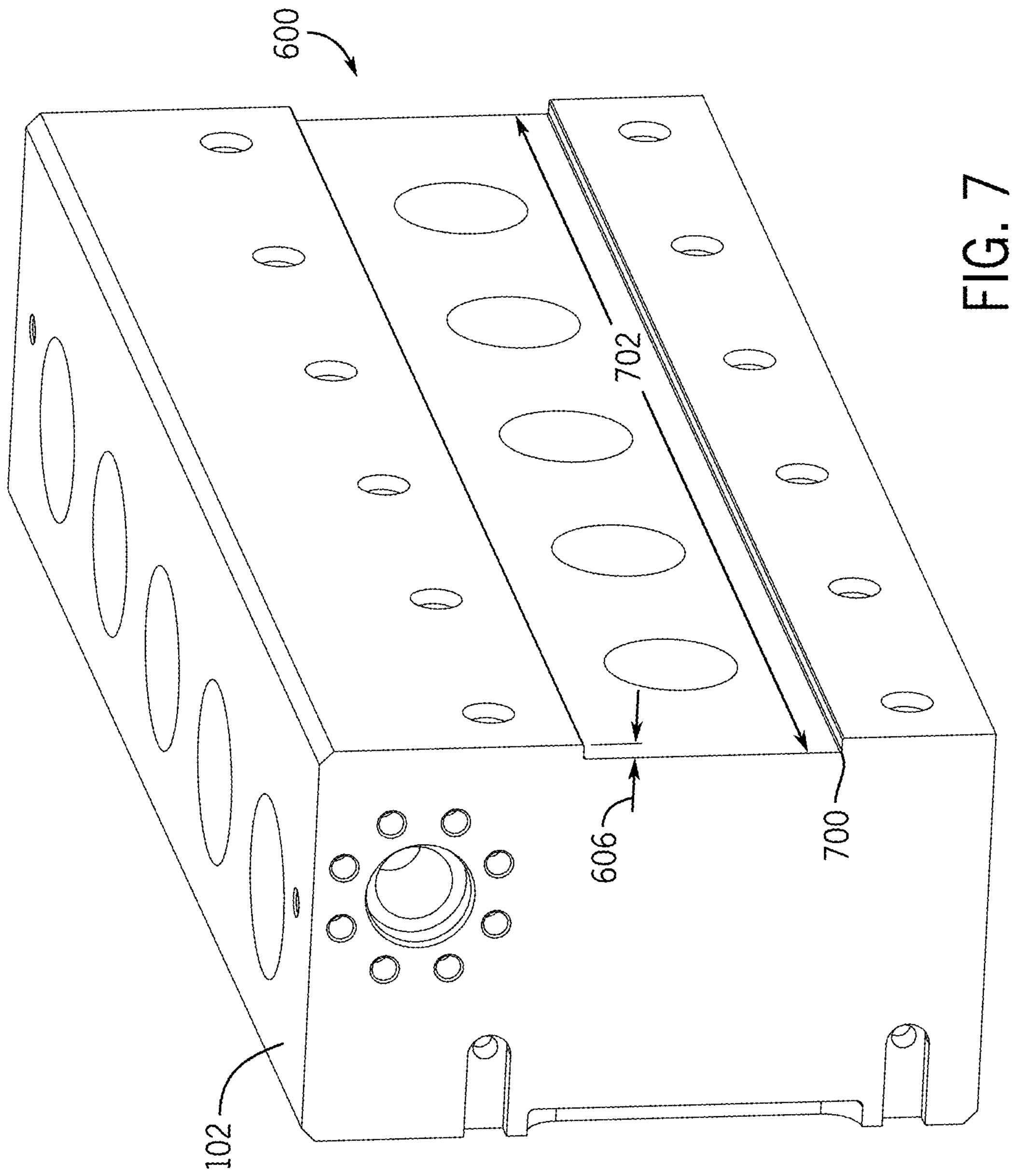
FIG. 7 is an isometric view of an embodiment of a fluid end, in accordance with embodiments of the present disclosure.

FIG. 7 is a schematic view of an embodiment of the fluid end 102 illustrating the cut out region 600. In this example, the cut out region 600 is substantially squared. That is, the sloped entry 602 (FIG. 6) is replaced by a squared entry 700, which may be substantially 90 degrees. Like the sloped entry 602, the squared entry 700 may be referred to as having a polygonal profile. The squared entry 700 transitions to the depth 606, as noted above. Moreover, the cut out region 600 extends for a fluid end length 702, but it should be appreciated that the cut out region 600 may be segmented or not extend the full length 702. The illustrated depth 606 is also particularly selected based on operating conditions.

In one or more embodiments, the fluid end 102 is forged or otherwise manufactured in the configuration shown, which may result in less material being utilized in operations. In one or more embodiments, the fluid end 102 may also be machined to include the cut out region 600. Accordingly, the general shape of the cut out region 600 may also be selected, at least in part, with manufacturing considerations in mind.

Figure 8:
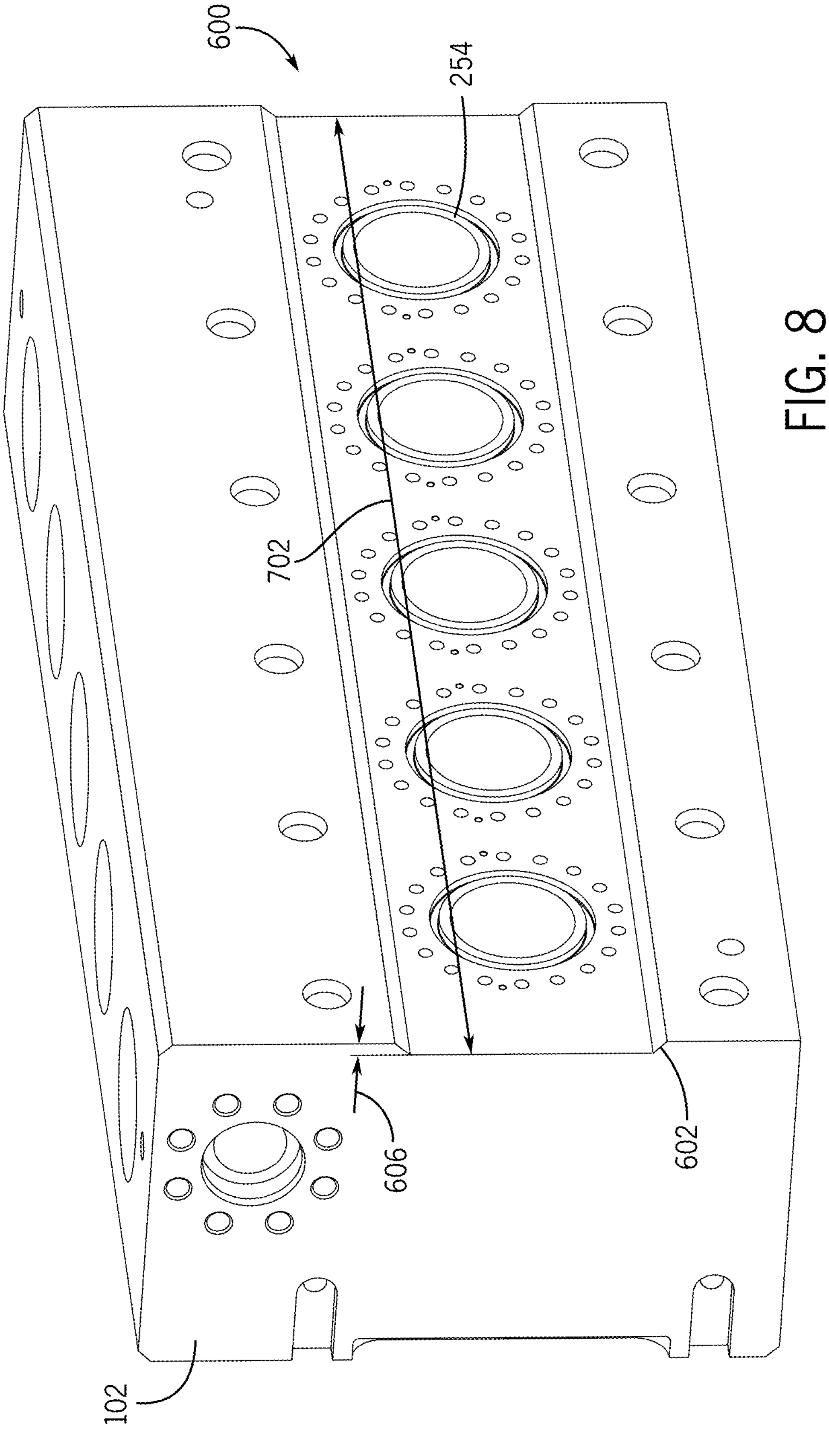
FIG. 8 is an isometric view of an embodiment of a fluid end, in accordance with embodiments of the present disclosure.

FIG. 8 is a schematic view of an embodiment of the fluid end 102 illustrating the cut out region 600. In this example, the sloped entry 602 is visible, as shown in FIG. 6. Moreover, the cut out region 600 extends for a fluid end length 702, but it should be appreciated that the cut out region 600 may be segmented or not extend the full length 702. The illustrated depth 606 is also particularly selected based on operating conditions. This example further includes the face groove 254 for the face seal 252 (FIG. 2) and the apertures for receiving the fasteners 268 (FIG. 2).

Figure 9:
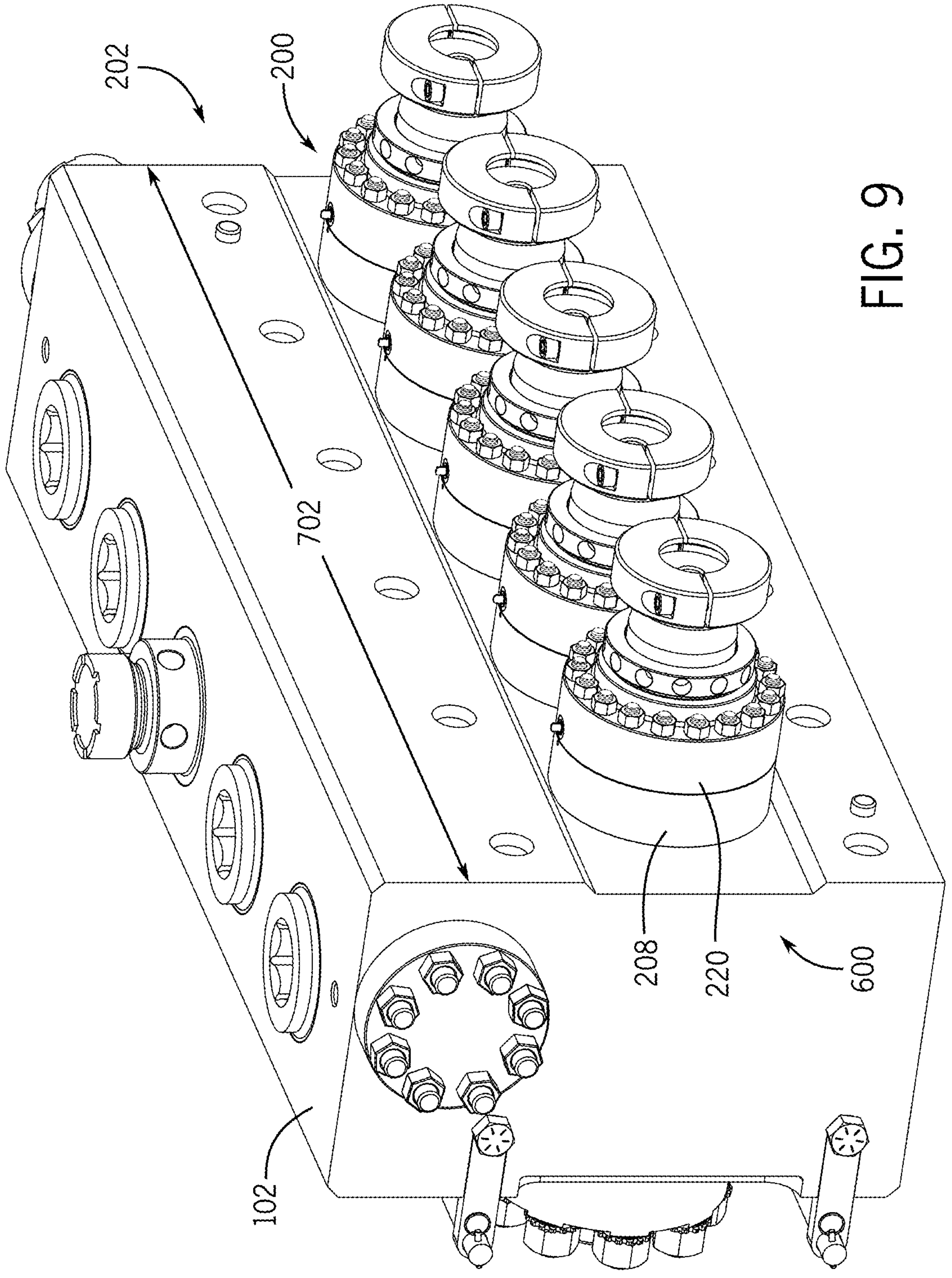
FIG. 9 is an isometric view of an embodiment of a fluid end with a stuffing box assembly, in accordance with embodiments of the present disclosure.

FIG. 9 is an isometric view of an embodiment of the fluid end 102 including the stuffing box assemblies 200 coupled to the back side 202 within the cut out region 600. In this example, the cut out region 600 extends for the fluid end length 702. As noted above, in various embodiments of the present disclosure, stuffing box assemblies 200 are arranged such that one or more components bear against the back side 202 of the fluid end 102 and without extending into the bore 100.

It should be appreciated that various embodiments of the present disclosure may incorporate materials formed from similar or dissimilar materials. By way of example, the pressure ring 208 may be formed from a stronger, more resistant material than the adjacent ring 220 due to the pressure ring 208 being in contact with pressurized fluid while the adjacent ring 220 may be isolated from the fluid. Accordingly, less expensive materials may be utilized for the adjacent ring 220. It should be appreciated that all materials used may be particularly selected for expected operating conditions.

Figure 10:
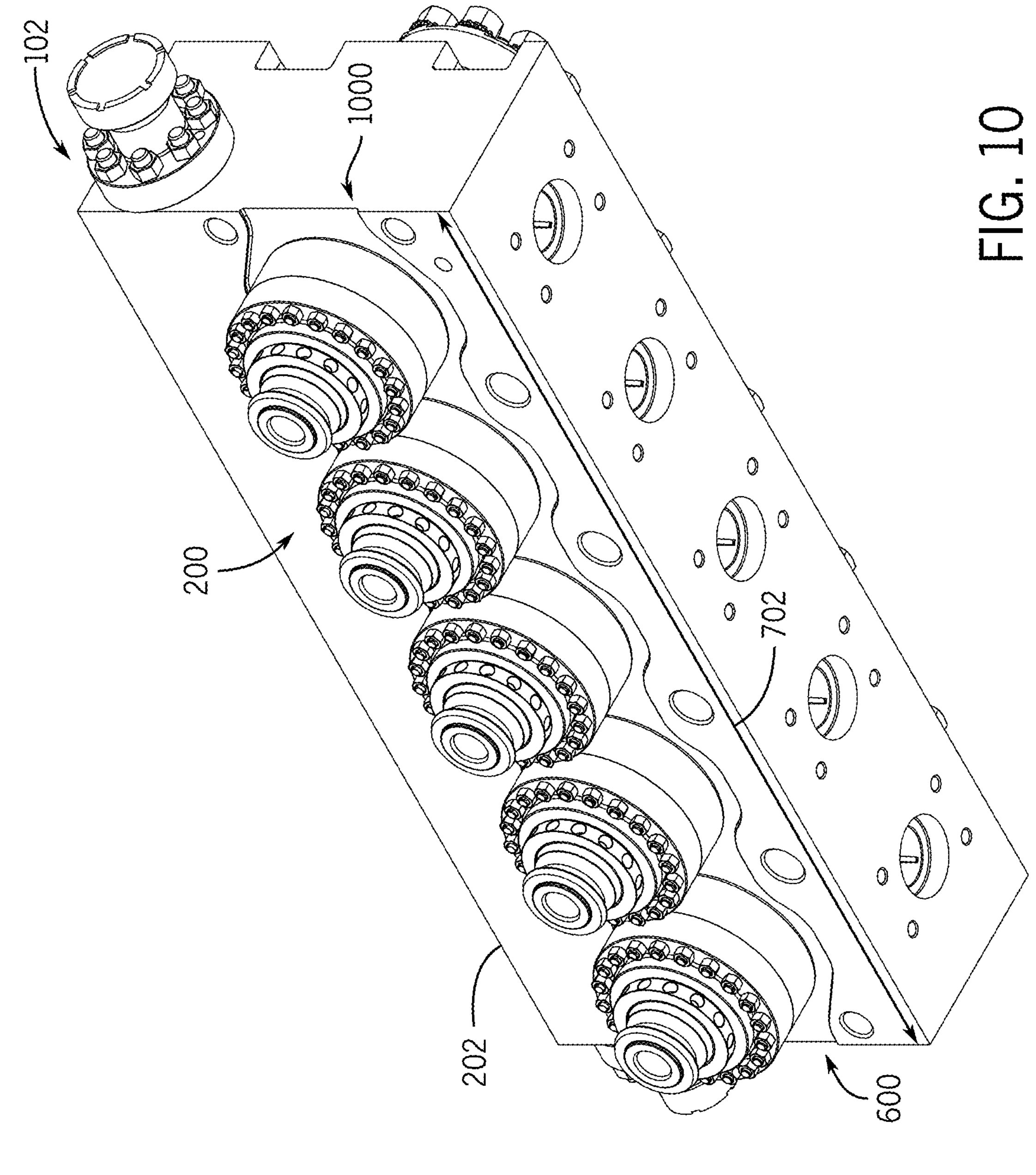
FIG. 10 is an isometric view of an embodiment of a fluid end with a stuffing box assembly, in accordance with embodiments of the present disclosure.

FIG. 10 is a bottom perspective view of an embodiment of the fluid end 102 including the cutout region 600 having a sinusoidal pattern 1000, which may also be referred to as having a curved or arcuate profile. As noted above, while various embodiments may include the squared entry and/or the sloped entry, a variety of different patterns may be included for forming the cutout region 600. In this example, the sinusoidal pattern 1000 extends along the length 702 of the fluid end 102. As noted above, in various embodiments of the present disclosure, stuffing box assemblies 200 are arranged such that one or more components bear against the back side 202 of the fluid end 102 and without extending into the bore 100.

Figure 11:
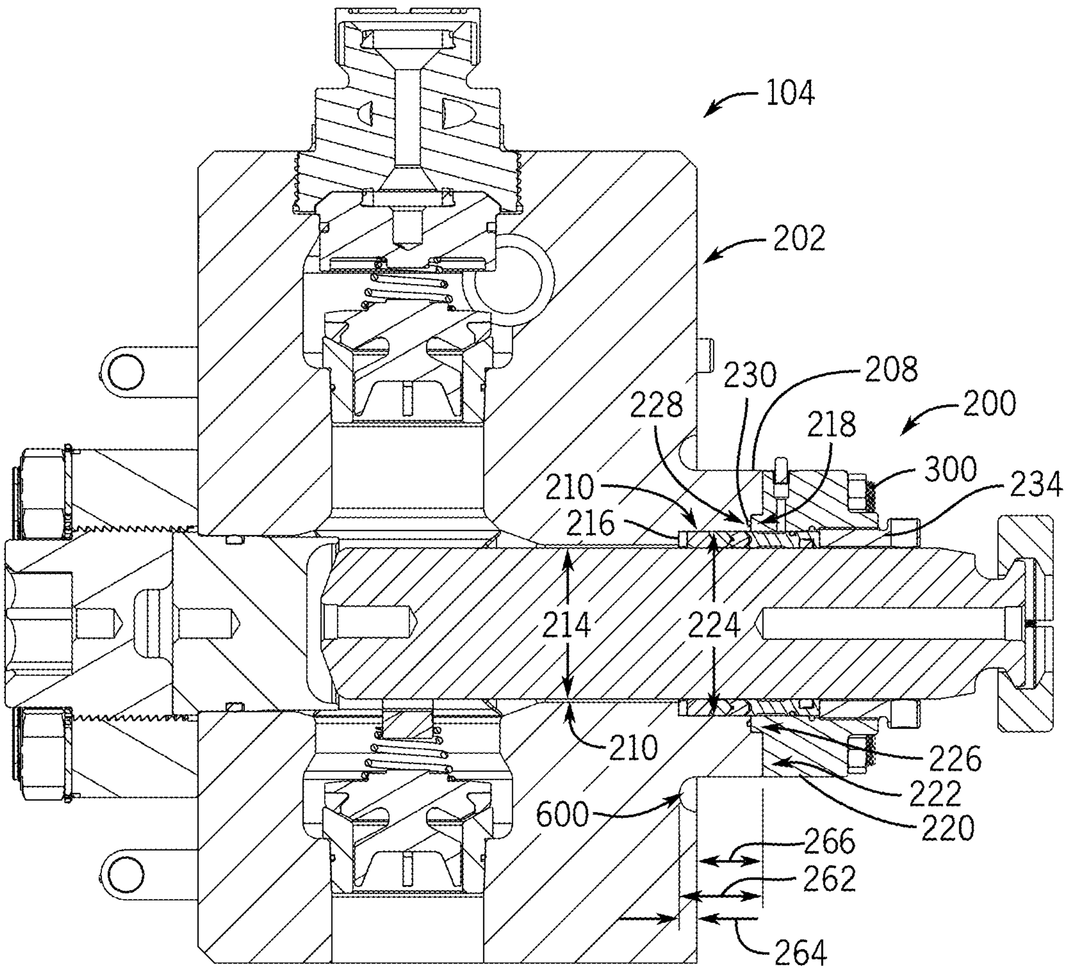
FIG. 11 is a cross-sectional view of an embodiment of a stuffing box assembly, in accordance with embodiments of the present disclosure.
Figure 12:
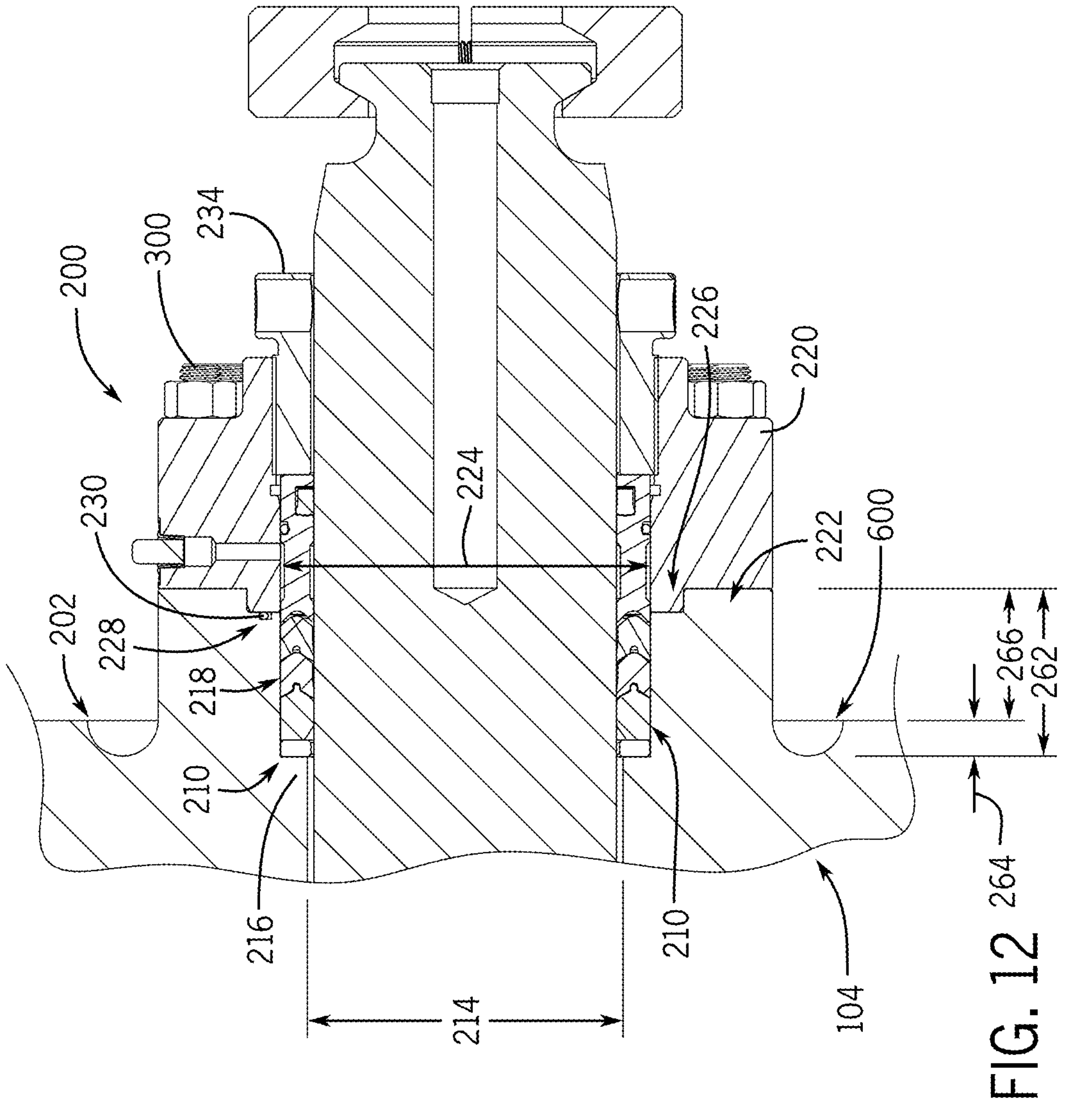
FIG. 12 is a cross-sectional view of an embodiment of a stuffing box assembly, in accordance with embodiments of the present disclosure.

FIGS. 11 and 12 are cross-sectional views of an embodiment of the fluid end 102 including the stuffing box assembly 200 in which the pressure ring 208 is integrally formed with and/or is a continuous portion of the fluid end block 104. In this example, the pressure ring 208 extends axially out of the cut out region 600 and may replace or otherwise incorporate the mating face 604 (FIG. 6) described above with a continuous material layout such that the pressure ring 208 is formed from a common material with respect to the fluid end block 104.

As noted above, the pressure ring 208 includes the pressure ring bore 210, which has a larger diameter (e.g., diameter 224) than the bore diameter 214. In this manner, the shelf 216 may be formed along the fluid end block 104 to receive and support the packing materials 218, as noted above. Accordingly, the packing materials 218 may be described as not extending into the bore 110 of the fluid end block 104 and being axially blocked or restricted from moving into the bore 110 by the shelf 216. Further illustrated in FIGS. 11 and 12 are the seal groove 228 and seal 230 between the pressure ring 208 and the adjacent ring 220.

As will be appreciated, various features of FIG. 2 are shared in FIGS. 11 and 12, including the configuration of the adjacent ring 220 with respect to the pressure ring 208. For example, in this example, a lip 226 of the adjacent ring 220 may extend axially toward the bore 110 such that a portion of the pressure ring 208 radially overlaps at least a portion of the adjacent ring 220. This may be referred to as the overlapped region 222, as noted above, where the pressure ring 208 includes the diameter 224 to accommodate the lip 226. Further shown is the retainer 234 extending into the adjacent ring 220 to secure the packing materials 218 in place.

Various embodiments of the present disclosure illustrate a secure coupling between the adjacent ring 220 and the pressure ring 208 and/or the fluid end block 104 via one or more fasteners 300, which may extend through apertures or holes through the adjacent ring 220 and/or pressure ring 208 and/or fluid end block 104 that are aligned to permit passage of the fasteners 300. As noted above, fasteners 300 are provided by way of example only and various other components may be utilized to join different features together, such as press fittings, interference fits, adhesives, bayonet connections, tongue and groove fittings, and the like.

Embodiments of the present disclosure further illustrate an arrangement that permits easier access to different components of the stuffing box assembly 200 due to the improved clearance between components. For example, as noted above, the pressure ring 208 may extend axially away from the back side 202 such that at least a portion of the pressure ring thickness 262 is external the groove 204. That is, the pressure ring thickness 262 may include the internal portion 264 that is within the groove 204 and the external portion 266 that is outside of the groove 204. In various embodiments, the internal portion 264 is less than the external portion 266, but it should be appreciated that a variety of configurations may be utilized within the scope of the present disclosure (e.g., internal greater than external, portions equal, etc.). When combined with the groove 204, which may have a depth 606 (FIG. 6), additional clearance area may be provided to various components, such as the fasteners 300, thereby providing improved access for maintenance or other operations, such as packing replacement and the like.

Figure 13:
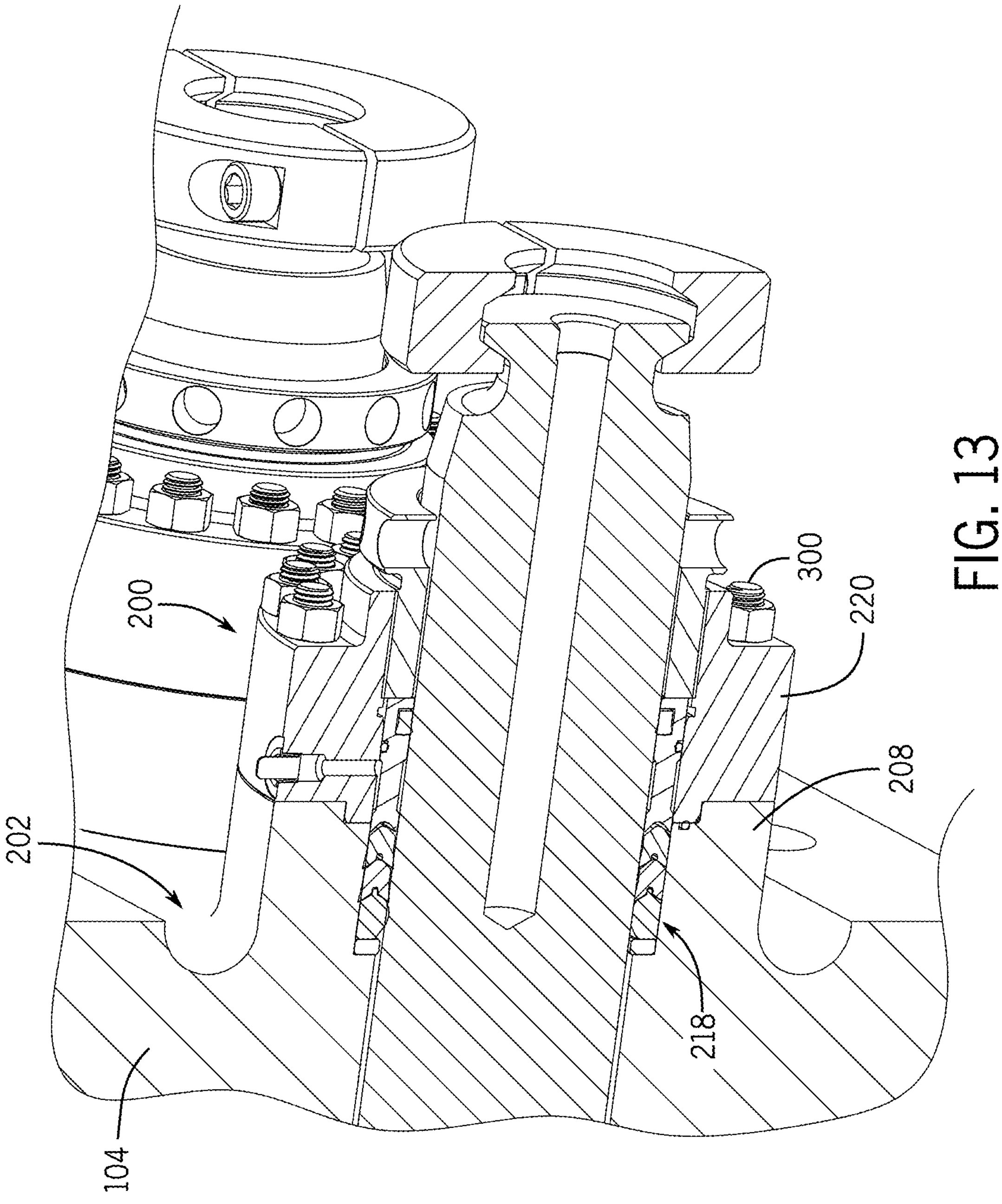
FIG. 13 is a sectional isometric view of an embodiment of a stuffing box assembly, in accordance with embodiments of the present disclosure.

FIG. 13 is a sectional perspective view of an embodiment of the stuffing box assembly 200 illustrating the pressure ring 208 formed as an integral feature of the fluid end block 104. In this example, the pressure ring 208 extends away from the back side 202, which may permit increased working area for operators, as shown with respect to the illustrated fasteners 300. Further illustrated is the arrangement of the adjacent ring 220 axially outward with respect to the back side 202. As noted, this configuration may permit the adjacent ring 220 to be formed from materials that are less expensive and/or less likely to be in contact with corrosive or otherwise high pressure fluids, for example, due to the arrangement of the packing materials 218. It should, however, be appreciated that various embodiments may adjust one or more dimensions such that the adjacent ring 220 extends axially closer to the back end 202 such that the packing materials 218 overlap or otherwise are positioned adjacent to the adjacent ring 220.

Figure 14:
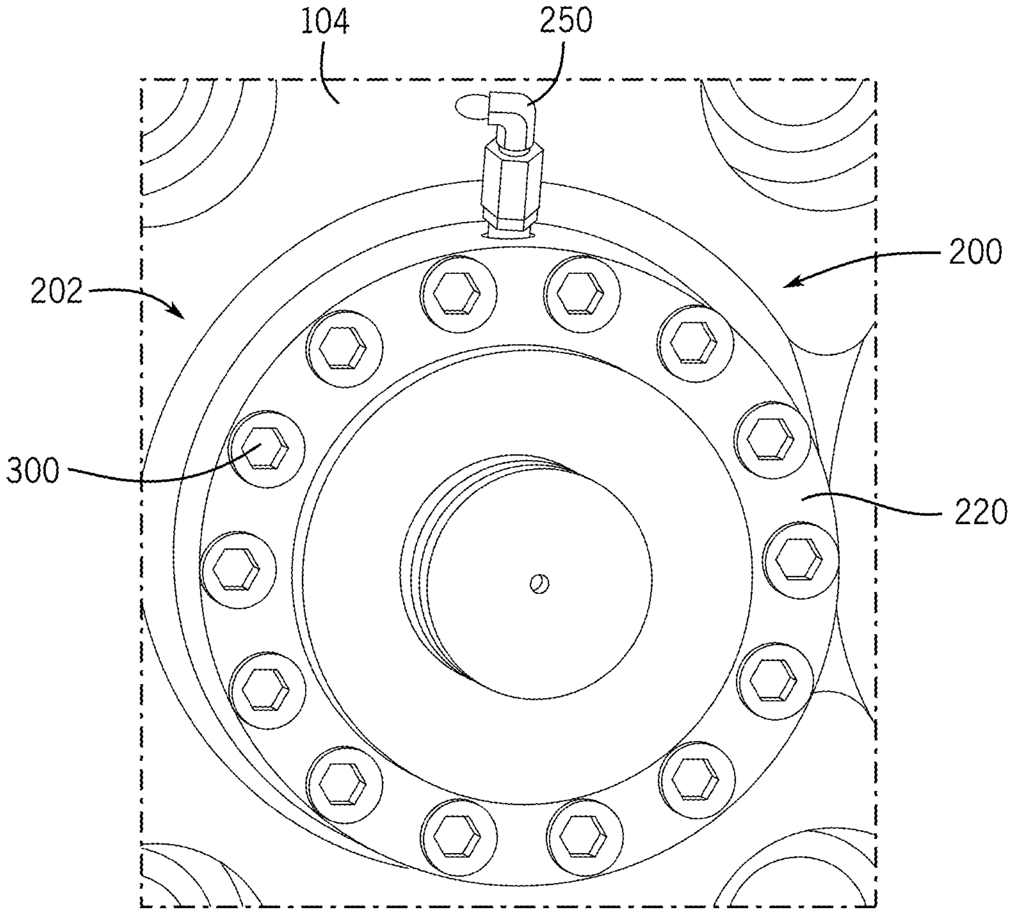
FIG. 14 is a perspective view of an embodiment of a stuff boxing assembly, in accordance with embodiments of the present disclosure.

FIG. 14 is a perspective view of an embodiment of the stuffing box assembly 200 that illustrates the adjacent ring 220 extending axially away from the back side 202. Further illustrated in this configuration is the injection port 250. As shown, the fasteners 300 are arranged circumferentially to extend through the adjacent ring 220, which may further go through aligned holes in the pressure ring 208 (FIGS. 11-13), which may or may not extend all the way to the fluid end block 104 (e.g., through the entire pressure ring thickness 262 (FIGS. 11 and 12).

This application is a continuation of U.S. Non-Provisional application Ser. No. 18/775,355, filed Jul. 17, 2024, titled "DUAL RING STUFFING BOX," which is a continuation of U.S. Non-Provisional application Ser. No. 17/864,873, filed Jul. 14, 2022, titled "DUAL RING STUFFING BOX," now U.S. Pat. No. 12,055,221, issued Aug. 6, 2024, which is a continuation-in-part of U.S. patent application Ser. No. 17/213,854, filed Mar. 26, 2021, titled "DUAL RING STUFFING BOX," now U.S. Pat. No. 11,391,374, issued Jul. 19, 2022, which claims the benefit of U.S. Provisional Ser. No. 63/137,501 , filed Jan. 14, 2021, titled "DUAL RING STUFFING BOX.," and is a continuation-in-part and claims the benefit of U.S. patent application Ser. No. 29/769,314, filed Feb. 4, 2021, titled "FLUID END FOR A PUMPING SYSTEM," now U.S. Pat. No. D933104, issued Oct. 12, 2021, and is a continuation-in-part and claims the benefit of U.S. patent application Ser. No. 29/769,318, filed on Feb. 4, 2021, titled "FLUID END FOR A PUMPING SYSTEM," now U.S. Pat. No. D933105, issued Oct. 12, 2021, the disclosures of which are incorporated herein by reference in their entireties for all purposes.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A fluid end comprising:

a fluid end body having a base;

a fluid end bore positioned in the fluid end body and having a fluid end bore diameter;

a pressure ring positioned to extend from the base, the pressure ring including a ring bore having a ring bore diameter greater than the fluid end bore diameter;

an adjacent ring connected to the fluid end, positioned between the adjacent ring and the base, and including an aperture;

one or more fasteners positioned to extend (a) through the aperture of the adjacent ring to connect the adjacent ring to the fluid end and (b) through the pressure ring and into the base; and packing material positioned in the ring bore, thereby to inhibit axial movement.

2. The fluid end of claim 1, further comprising a shelf positioned to support the packing material, the shelf located at a transition between the pressure ring bore diameter and the fluid end bore diameter, and wherein axial movement of the packing material further is blocked by the base.

3. A fluid end comprising:

a fluid end body having a base;

a fluid end bore positioned in the fluid end body;

a pressure ring positioned to extend from the base and including a pressure ring bore;

an adjacent ring connected to the fluid end, the pressure ring positioned between the adjacent ring and the base;

one or more fasteners extending through an aperture of the adjacent ring to connect the adjacent ring to the fluid end;

packing material positioned in the pressure ring bore, so that axial movement is inhibited by the base; and a shelf positioned to support the packing material.

4. The fluid end of claim 3, wherein the pressure ring is integrally formed with the fluid end, and wherein the shelf includes, at least in part, a spacer ring.

5. The fluid end of claim 3, further comprising:

a cut out region defining a recessed area positioned to surround the pressure ring, the cut out region positioned to extend axially into the fluid end face, toward the base, for a cut out depth, and wherein axial movement of the packing material further is blocked by the base.

6. The fluid end of claim 5, wherein the pressure ring has a pressure ring thickness, wherein the pressure ring thickness includes an internal portion and an external portion, and wherein the internal portion has a thickness approximately equal to the cut out depth.

7. The fluid end of claim 5, wherein the cut out region is positioned to extend for a length of the fluid end body.

8. The fluid end of claim 3, further comprising:

an overlapping region located between the pressure ring and the adjacent ring, and wherein the pressure ring includes a recess to receive a lip of the adjacent ring.

9. The fluid end of claim 3, further comprising:

a seal positioned between the pressure ring and the adjacent ring.

10. A fluid end comprising:

a fluid end body;

a recessed area positioned in the fluid end body;

a fluid end bore positioned in the fluid end body;

a pressure ring positioned to extend from the recessed area, the pressure ring having a pressure ring thickness and a pressure ring bore positioned co-axially with the fluid end bore;

an adjacent ring positioned against the pressure ring and connected to the fluid end body;

one or more fasteners extending through the pressure ring thickness;

packing material positioned in the pressure ring bore, at least a portion of the packing material also positioned external to the fluid end bore; and an injection port positioned to extend through the adjacent ring and located in a low pressure region.

11. The fluid end of claim 10, further comprising a seal positioned between the pressure ring and the adjacent ring, wherein the pressure ring and the adjacent ring are connected together via the one or more fasteners, and wherein the injection port further is positioned axially away from the seal.

12. The fluid end of claim 10, wherein the pressure ring is integrally formed with the fluid end.

13. The fluid end of claim 10, wherein the pressure ring and the adjacent ring are at least one of threaded together or connected together via a bayonet connection.

14. The fluid end of claim 10, further comprising:

a shelf located at a transition between the pressure ring bore and the fluid end bore, and wherein the shelf receives and supports the packing material.

15. The fluid end of claim 10, wherein the recessed area comprises one or more of a polygonal profile or a curved profile.

16. A method of assembly of a portion of a fluid end, the method comprising:

positioning an adjacent ring against a pressure ring positioned to extend axially out of a fluid end face of a fluid end, the pressure ring including a selected pressure ring thickness and a pressure ring bore;

securing the adjacent ring to the fluid end via one or more fasteners extending through the selected pressure ring thickness of the pressure ring; and installing packing material into the pressure ring bore, thereby to assemble the portion of the fluid end.

17. The method of claim 16, further comprising:

connecting a retainer, thereby to compress the packing material against a shelf located at a transition between a fluid end bore of the fluid end and the pressure ring bore.

18. The method of claim 16, wherein the pressure ring is integrally formed with the fluid end.

19. The method of claim 16, further comprising:

positioning a seal between the pressure ring and the adjacent ring, and connecting the pressure ring and the adjacent ring together via one or more fasteners.

20. The method of claim 19, wherein the fluid end further includes an injection port located axially away from the seal.

* * * * *